US012389111B2

(12) United States Patent
Koci

(10) Patent No.: US 12,389,111 B2
(45) Date of Patent: Aug. 12, 2025

(54) ELECTROADHESION DEVICE

(71) Applicant: SELFIE SNAPPER, INC., Sherman Oaks, CA (US)

(72) Inventor: Denis Koci, Woodland Hills, CA (US)

(73) Assignee: SELFIE SNAPPER, INC., Sherman Oaks, CA (US)

( * ) Notice: Subject to any disclaimer, the term of this patent is extended or adjusted under 35 U.S.C. 154(b) by 0 days.

(21) Appl. No.: 18/235,770

(22) Filed: Aug. 18, 2023

(65) Prior Publication Data

US 2023/0403461 A1 Dec. 14, 2023

Related U.S. Application Data

(63) Continuation of application No. 17/671,498, filed on Feb. 14, 2022, now Pat. No. 11,770,607, which is a
(Continued)

(51) Int. Cl.
*H04N 23/661* (2023.01)
*G02B 7/36* (2021.01)
*H04N 23/67* (2023.01)

(52) U.S. Cl.
CPC .......... *H04N 23/661* (2023.01); *H04N 23/67* (2023.01); *G02B 7/36* (2013.01)

(58) Field of Classification Search
CPC ...... H04N 23/661; H04N 23/67; H04N 23/60; H04N 23/65; G02B 7/36; G03B 15/10;
(Continued)

(56) References Cited

U.S. PATENT DOCUMENTS 7,328,119 B1 2/2008 Pryor et al.
7,551,419 B2 6/2009 Pelrine et al.
(Continued)

FOREIGN PATENT DOCUMENTS

CN 103597519 A 2/2014
CN 203889500 U 10/2014
(Continued)

OTHER PUBLICATIONS

Guo J., et al., "Electroadhesion Technologies for Robotics: A Comprehensive Review," IEEE Transactions on Robotics, Apr. 2020, vol. 36, No. 2, DOI:10.1109/TRO.2019.2956869, XP011781873, [Retrieved on Aug. 21, 2021] Retrieved from URL: https://ieeexplore.ieee.org/document/8946902.
(Continued)

*Primary Examiner* — Gevell V Selby
(74) *Attorney, Agent, or Firm* — DLA PIPER LLP (US); Blake W. Jackson

(57) ABSTRACT

Disclosed embodiments include a selfie camera system for capturing selfie content and sharing captured content on a social media and/or a video streaming platform. In various embodiments, selfie camera makes capturing higher quality selfie content more efficient by providing a preview of the selfie content before and after capture. One or more aspects of previews may be modified to simulate content displayed on a social media and/or video streaming platform. The selfie camera may be easily attached to any surface using one or more mounting mechanisms to allow the selfie camera for function as a personal, private photographer than can capture any scene from a variety of perspectives using a variety of capture sequences.

20 Claims, 17 Drawing Sheets

Related U.S. Application Data continuation of application No. 16/922,979, filed on Jul. 7, 2020, now Pat. No. 11,283,982.

(60) Provisional application No. 62/956,054, filed on Dec. 31, 2019, provisional application No. 62/871,158, filed on Jul. 7, 2019.

(58) Field of Classification Search
CPC .......... G03B 2206/00; G03B 2217/002; G03B 2217/007; G03B 17/02; G03B 17/56; H04M 2250/52; H04M 1/72412
See application file for complete search history.

(56) References Cited

U.S. PATENT DOCUMENTS

| | | |
|---|---|---|
| 7,554,787 B2 | 6/2009 | Pelrine et al. |
| 7,684,694 B2 | 3/2010 | Fromm |
| 7,773,363 B2 | 8/2010 | Pelrine et al. |
| 7,872,850 B2 | 1/2011 | Pelrine et al. |
| 8,111,500 B2 | 2/2012 | Pelrine et al. |
| 8,125,758 B2 | 2/2012 | Pelrine et al. |
| 8,325,458 B2 | 12/2012 | Prahlad et al. |
| D692,473 S | 10/2013 | Kawaguchi et al. |
| 8,564,926 B2 | 10/2013 | Prahlad et al. |
| D697,122 S | 1/2014 | Ikegame |
| 8,665,578 B2 | 3/2014 | Pelrine et al. |
| 8,861,171 B2 | 10/2014 | Prahlad et al. |
| 8,982,531 B2 | 3/2015 | Prahlad et al. |
| 9,401,668 B2 | 7/2016 | Prahlad et al. |
| D779,577 S | 2/2017 | Ikegame |
| D781,363 S | 3/2017 | Ikegame |
| D797,836 S | 9/2017 | Li |
| 9,769,332 B1 | 9/2017 | Delaunay et al. |
| D848,512 S | 5/2019 | Kamei |
| D849,077 S | 5/2019 | Tian |
| 10,452,146 B2 * | 10/2019 | Khoshkava ............. G06F 3/016 |
| D876,518 S | 2/2020 | Tran et al. |
| D887,478 S | 6/2020 | Brickner et al. |
| D894,994 S | 9/2020 | Yu |
| D906,399 S | 12/2020 | Wang |
| D908,765 S | 1/2021 | Wang |
| D916,166 S | 4/2021 | Li |
| D939,607 S | 12/2021 | Koci |
| 2003/0067734 A1 | 4/2003 | Nakano |
| 2006/0010454 A1 | 1/2006 | Napoli et al. |
| 2006/0244620 A1 | 11/2006 | Sotiriou |
| 2007/0074115 A1 | 3/2007 | Patten et al. |
| 2007/0081094 A1 | 4/2007 | Ciudad et al. |
| 2007/0254640 A1 | 11/2007 | Bliss |
| 2008/0037971 A1 | 2/2008 | Takami et al. |
| 2008/0089002 A1 | 4/2008 | Pelrine et al. |
| 2008/0211341 A1 | 9/2008 | Pelrine et al. |
| 2009/0065348 A1 | 3/2009 | Fujii |
| 2010/0249553 A1 * | 9/2010 | MacLaughlin ........ A61B 5/257 |
| | | 600/324 |
| 2011/0193362 A1 | 8/2011 | Prahlad et al. |
| 2012/0062691 A1 | 3/2012 | Fowler et al. |
| 2012/0120544 A1 | 5/2012 | Pelrine et al. |
| 2013/0242455 A1 | 9/2013 | Prahlad et al. |
| 2013/0292303 A1 | 11/2013 | Prahlad et al. |
| 2013/0294875 A1 | 11/2013 | Prahlad et al. |
| 2014/0009861 A1 | 1/2014 | Tatsumi et al. |
| 2014/0036404 A1 | 2/2014 | Prahlad et al. |
| 2014/0085460 A1 | 3/2014 | Park et al. |
| 2014/0108552 A1 | 4/2014 | Singh et al. |
| 2014/0133062 A1 | 5/2014 | Prahlad et al. |
| 2015/0138595 A1 | 5/2015 | Sugimoto |
| 2016/0041628 A1 | 2/2016 | Verma |
| 2016/0094078 A1 | 3/2016 | Graham et al. |
| 2016/0100034 A1 | 4/2016 | Miller |
| 2016/0318190 A1 * | 11/2016 | Prahlad ............... H01L 21/6833 |
| 2016/0350953 A1 | 12/2016 | Mittelstaedt et al. |
| 2017/0031235 A1 | 2/2017 | Kubotera et al. |
| 2017/0068149 A1 | 3/2017 | Fromm |
| 2017/0072407 A1 | 3/2017 | Prahlad et al. |
| 2017/0291806 A1 | 10/2017 | Lessing et al. |
| 2017/0331952 A1 | 11/2017 | Rogers et al. |
| 2017/0372525 A1 | 12/2017 | Rosenthal et al. |
| 2018/0054595 A1 | 2/2018 | Odamaki et al. |
| 2018/0137523 A1 | 5/2018 | Kim et al. |
| 2018/0350148 A1 | 12/2018 | George |
| 2018/0356711 A1 | 12/2018 | Otsuka et al. |
| 2019/0047157 A1 | 2/2019 | Shintake et al. |
| 2019/0075922 A1 | 3/2019 | Rivera et al. |
| 2019/0098190 A1 | 3/2019 | Hosoe |
| 2019/0158136 A1 | 5/2019 | DiLella |
| 2019/0172743 A1 | 6/2019 | McIntyre et al. |
| 2019/0263595 A1 * | 8/2019 | Prahlad .................. B65G 54/02 |
| 2020/0338731 A1 | 10/2020 | Lynders et al. |
| 2021/0006181 A1 | 1/2021 | Koci |
| 2021/0006706 A1 | 1/2021 | Koci |
| 2021/0008416 A1 | 1/2021 | DeCarlo |
| 2021/0203245 A1 | 7/2021 | Koci |
| 2021/0386219 A1 | 12/2021 | Koci |
| 2021/0387347 A1 | 12/2021 | Koci |
| 2022/0009086 A1 | 1/2022 | Verma |
| 2022/0174205 A1 | 6/2022 | Koci |

FOREIGN PATENT DOCUMENTS

| | | |
|---|---|---|
| EP | 2033216 A2 | 3/2009 |
| EP | 2041784 A2 | 4/2009 |
| EP | 2533951 A1 | 12/2012 |
| EP | 2548299 A2 | 1/2013 |
| EP | 2844592 A2 | 3/2015 |
| EP | 3056016 A1 | 8/2016 |
| EP | 3086016 A1 | 10/2016 |
| EP | 2041784 B1 | 10/2017 |
| EP | 3343507 A1 | 7/2018 |
| EP | 2033216 B1 | 12/2020 |
| JP | H07210104 A | 8/1995 |
| JP | H08191098 A | 7/1996 |
| JP | 2006500894 A | 1/2006 |
| JP | 2007251083 A | 9/2007 |
| JP | 2008282118 A | 11/2008 |
| JP | 2009262860 A | 11/2009 |
| JP | 2009539684 A | 11/2009 |
| JP | 5038405 B2 | 10/2012 |
| JP | 2012243991 A | 12/2012 |
| JP | 2013519532 A | 5/2013 |
| JP | 5329398 B2 | 10/2013 |
| JP | 2014236544 A | 12/2014 |
| JP | 5832386 B2 | 12/2015 |
| JP | 5883430 B2 | 3/2016 |
| JP | 5940028 B2 | 6/2016 |
| JP | 2017511262 A | 4/2017 |
| JP | 2017199179 A | 11/2017 |
| JP | 6423200 B2 | 11/2018 |
| KR | 20080106270 A | 12/2008 |
| KR | 20160131821 A | 11/2016 |
| KR | 20220043574 A | 4/2022 |
| WO | 2007143662 A2 | 12/2007 |
| WO | 2008070201 A2 | 6/2008 |
| WO | 2011100028 A1 | 8/2011 |
| WO | 2011116357 A2 | 9/2011 |
| WO | 2012150028 A1 | 11/2012 |
| WO | 2013166329 A2 | 11/2013 |

OTHER PUBLICATIONS

Savioli et al., "Morphing Electroadhesive Interface to Manipulate Uncooperative Objects," Proceedings of the SPIE, vol. 9061, id. 906129, Publication date Mar. 2014, 14 pages.
Extended European Search Report for Application No. 20837304.3, dated Oct. 4, 2023, 13 Pages.
Extended European Search Report for Application No. 20908755.0, dated Feb. 16, 2024, (13 Pages).
First Examination Report for Indian Patent Application No. 202247006152, dated Dec. 28. 2023 (6 pages).
Office Action for Canadian Patent Application No. 3163370, mailed Mar. 19, 2024, 4 pages.

(56) References Cited

OTHER PUBLICATIONS

Office Action for Japanese Patent Application No. 2022501135, mailed Jun. 13, 2024, 13 pages.
Yuan M., et al., "A Mixed Reality Virtual Clothes Try-on System," IEEE Transaction on Multimedia, Dec. 2013, vol. 15, No. 8, 11 pages.
Amazon, What is an API (Application Programming Interface), downloaded on Oct. 15, 2024, 6 pages, Retrieved from the Internet URL: https://aws.amazon.com/whatis/api/#:~:text=APIs%20are%20mechanisms%20that%20enable,use%20Simple%20Object%20Access%20Protocol.
Examination Report No. 1 for Australian Patent Application No. 2020309528 dated Jan. 14, 2025, 4 pages.
Office Action for Japanese Patent Application No. 2022-540681, mailed Dec. 2, 2024, 13 pages.
Office Action for Korean Patent Application No. 10-2022-7004022 mailed Nov. 25, 2024, 24 pages.
Office Action for Japanese Patent Application No. 2022-540681, mailed Jun. 19, 2025, 09 pages.
Office Action for Korean Patent Application No. 10-2022-7026452, mailed May 13, 2025, 19 pages.

\* cited by examiner

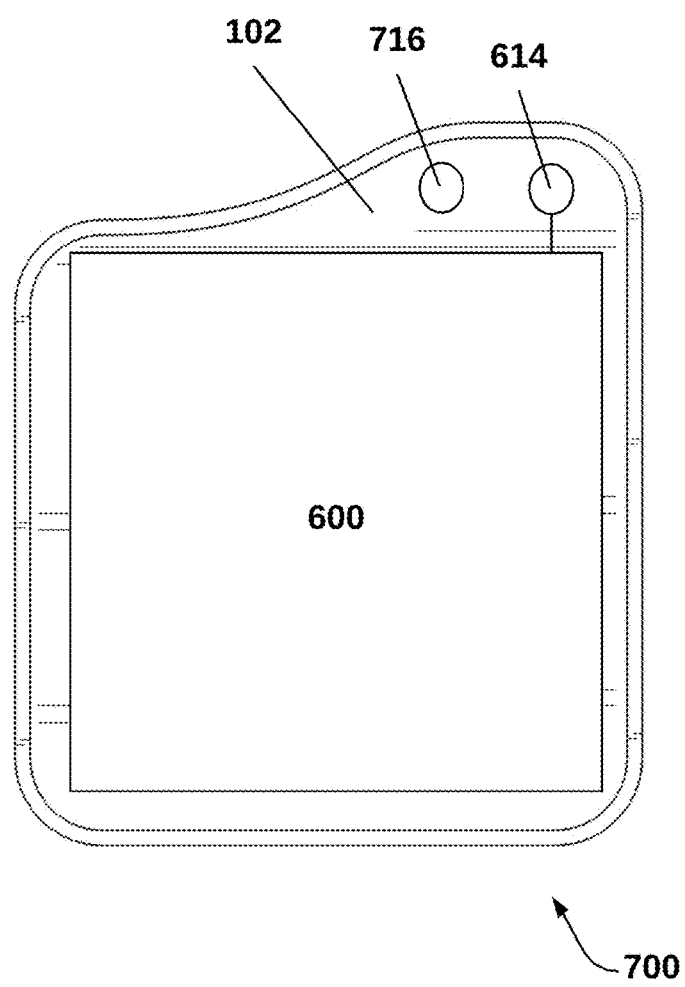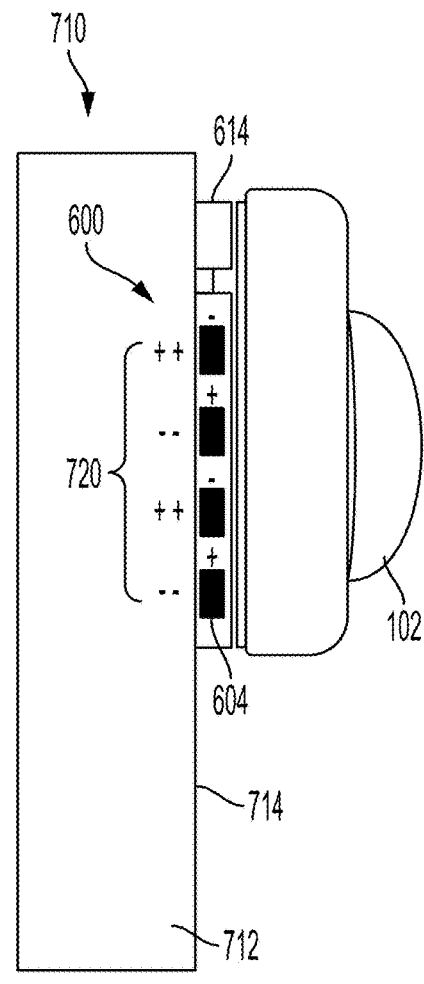
FIG. 7A  FIG. 7B

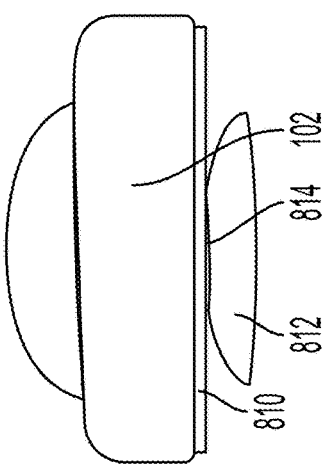
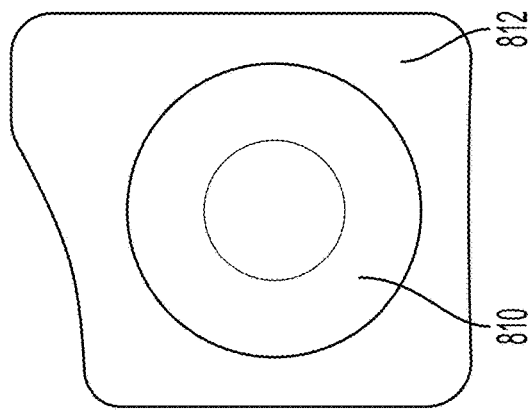
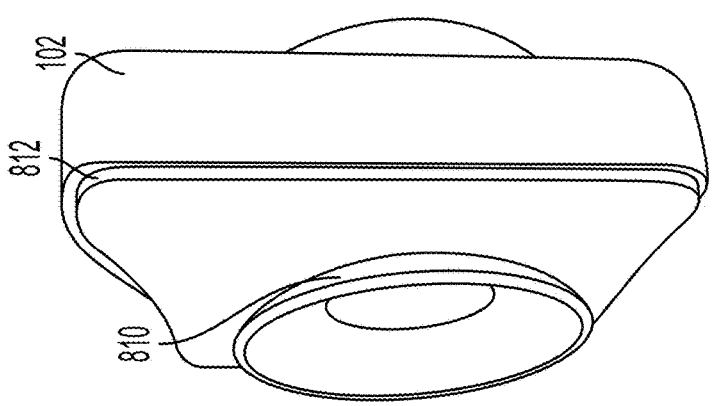
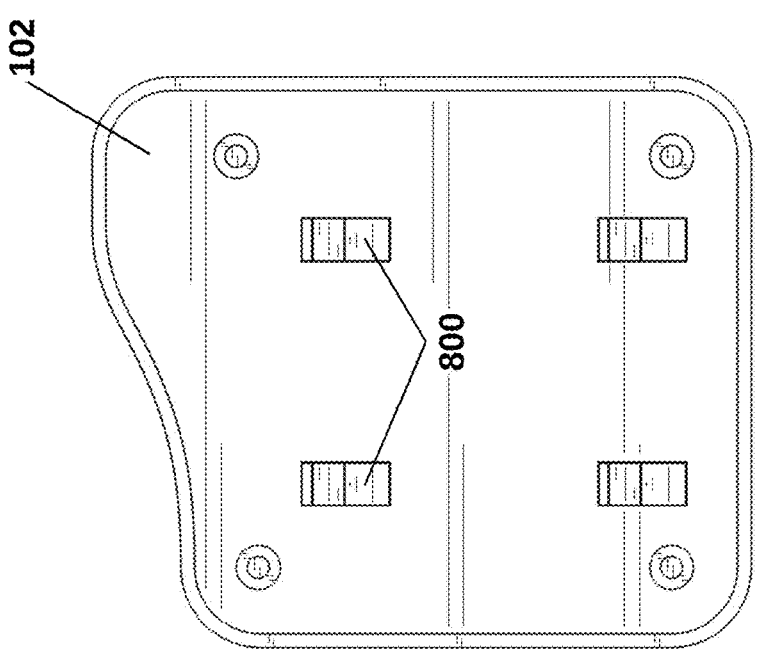

ELECTROADHESION DEVICE

PRIORITY CLAIM

This application is a Continuation of and claims priority to Ser. No. 17/671,498 filed 14 Feb. 2022 which is a continuation of and in turn claims priority to U.S. non-provisional Ser. No. 16/922,979 filed 7 Jul. 2020 which in turn claims priority from U.S. Provisional 62/956,054 filed 31 Dec. 2019 and U.S. Provisional 62/871,158 filed 7 Jul. 2019, the entirety of which are hereby incorporated by reference.

FIELD

The present disclosure relates generally to cameras and image processing, in particular, systems and methods for capturing and sharing selfie content.

BACKGROUND

Every day people take millions of self-portrait or "selfie" photos. Many of these photos are uploaded to social media platforms and shared as posts that provide updates about the selfie subject to a network of followers. Taking a good selfie is hard and a lot of time is wasted in re-taking photos to get the pose, angle, lighting, background, and other characteristics just right. There is therefore a need to develop a camera system that reduces the number of takes and overall amount of time required to produce a good selfie.

Taking a group selfie is also difficult and one or more people posing for a group photo are frequently cut off or left out of the shot. It would be desirable to have a camera system that allows for easy capture of group selfies that included everyone in a group.

Post capture, uploading selfies to social media platforms is frustrating and time consuming. Manually transferring photos from one device to another and, once on the proper device, from one platform to another adds time and complexity to social media posting. Transfers between devices and platforms and also introduce additional editing time and result in data loss (e.g., accidentally deleted phots, resolution loss, etc.). There is therefore a need to develop a camera system that reduces the overall time needed to post selfies and other items of content to social media platforms.

Previous attempts have been made to solve problems with capturing selfie content, but the arm capture method (i.e., pointing a smartphone camera at one's self and extending the camera away from the face/body to increase the field of view) is still the most commonly used technique. Although highly visible, selfie sticks provide only a marginally longer arm, therefore, maintain the limited capture angle and restricted field of view problems associated with arm capture. Remote timer and tripod systems have also been adapted to smartphones to take selfies but they take a long time to setup and do not provide an efficient way to preview photos before capture. Behavioral adaptions including mirror selfies and asking strangers to take photos have also been adopted but these solutions restrict the conditions in which selfies can be captured. No selfie specific camera solutions have been explored.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

FIGS. 7A-B illustrate a selfie camera mounted to a foreign object using the exemplary electro adhesion system shown in FIG. 6;

FIG. 8A-D illustrates an example mechanical mounting system for mounting a camera device shown in FIG. 4;

DETAILED DESCRIPTION OF ONE OR MORE EMBODIMENTS

As used herein, the terms "share", "shared", and "sharing" refer to the digital distribution of selfie content including images, recorded video, and live video. Selfie content may be shared using a user device (e.g., personal computer, laptop, camera, smart phone, tablet, etc.) directly to another user device. Additionally, selfie content may be shared with an online community (e.g., social media network, public online audience, group of online friends, etc.) by uploading to a host website or posting to a social media platform.

As used herein, the terms "subject" and "subjects" refer to the people, objects, landscapes, and/or background elements included in a photo or video. Human subjects may include a single person, multiple people, a group of people, multiple groups of people, and/or one or more crowds of people. Object subjects may include one or more pets, items and/or plates of food, one or more items of clothing, and/or any number of things or other objects.

As used herein, the terms "user device" and "user devices" refer to any computer device having a processor, memory, and a display. Exemplary user devices can include a communications component for connecting to a selfie camera and may include smartphones, tablet computers, laptops, mobile computers, hand held computers, personal computers, and the like.

As used herein, the terms "selfie image" and "selfie images" refer to images and videos of a person taken by that person. Portrait and/or self-portrait type images of objects (e.g., food, clothing, tools, jewelry, vehicles, memorabilia, personal items, and the like) and/or groups of people are also included in the terms "selfie image" and "selfie images" as disclosed herein.

As used herein the terms "piece of content" and "pieces of content" refer to images, video, and other content capable of capture by a selfie camera of the disclosure. Selfie images are exemplary pieces of content. Pieces of content may be transferred as data files including image data, audiovisual data, and the like using file/data lossless transfer protocols such as HTTP, HTTPS or FTP.

EXEMPLARY EMBODIMENTS OF THE SYSTEM

Figure 1:
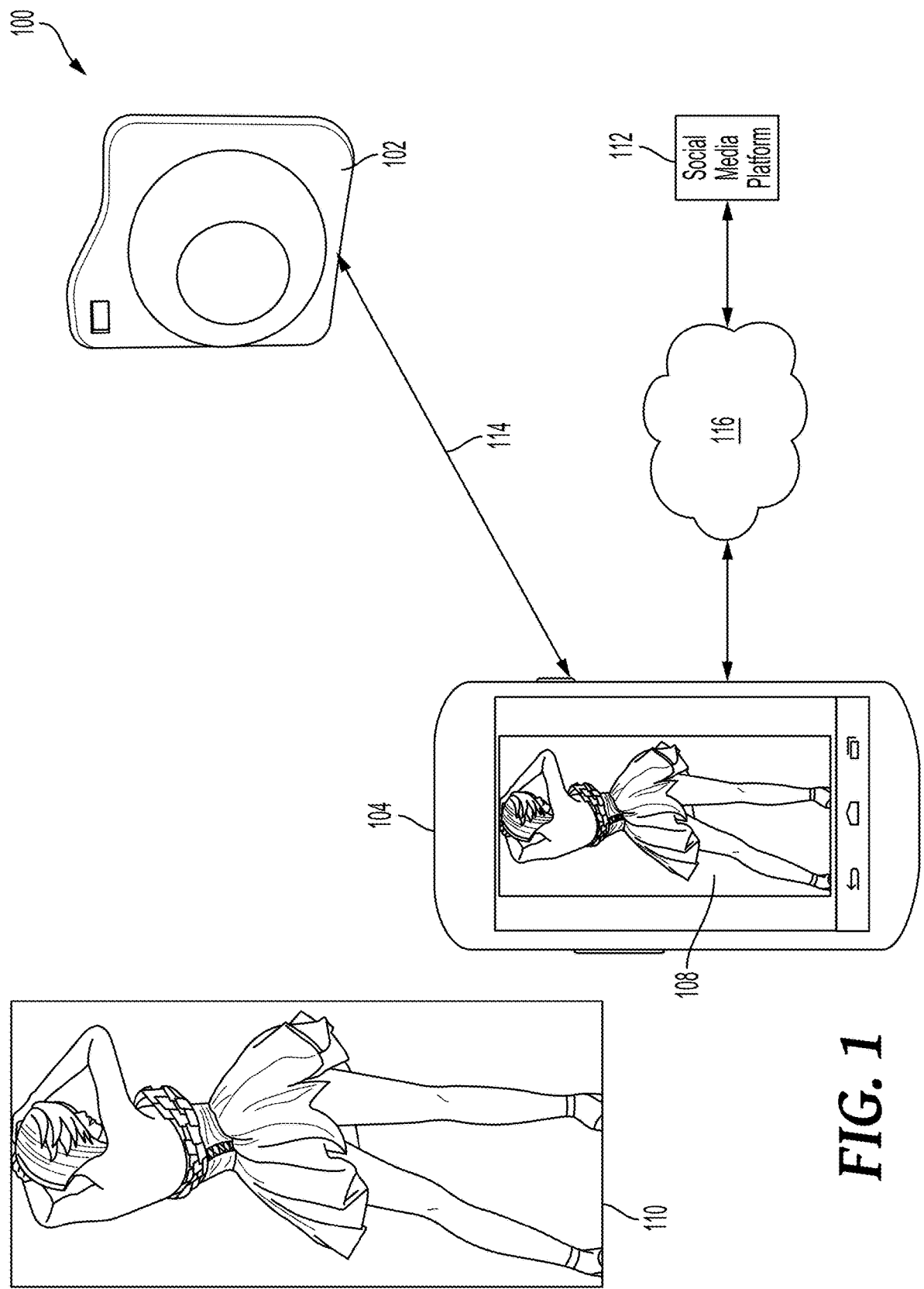
FIG. 1 depicts an exemplary system for capturing and sharing selfie content including selfie images.
Figure 2:
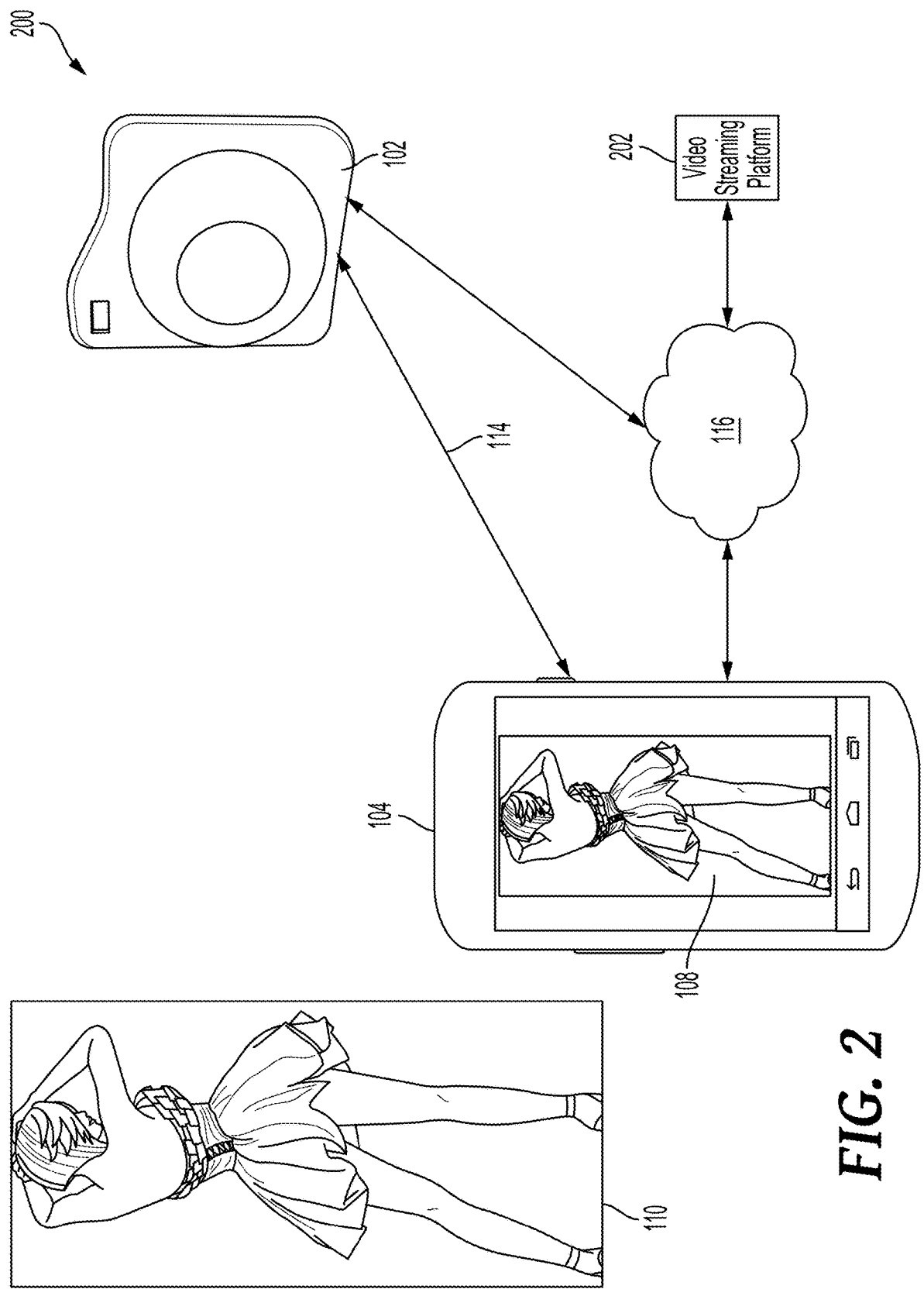
FIG. 2 depicts an exemplary system for capturing and sharing selfie content including selfie videos.

FIGS. 1-2 illustrate exemplary systems for capturing and sharing pieces of content including selfie images and videos. These systems may, for example, reduce the number of re-takes and overall time required to capture and share pieces of content including selfie images and videos. FIG. 1 illustrates an example embodiment of a selfie image system 100 that may capture and share pieces of content including selfie images. The selfie image system 100 may include a selfie camera 102 that captures pieces of content including a subject 110. The selfie camera 102 may be communicatively coupled to a user device 104 using one or more connections 114 (e.g., a Bluetooth, Wifi, or other wireless or wired connection). The selfie camera 102 may stream a preview 108 of the area within the field of the view of the selfie camera 102 to a user device 104. Using the user device 104 as a remote control, a user may capture a piece of content using the selfie camera 102. In various embodiments, the preview 108 may include a live video showing the subject 110 and surrounding area captured by the image sensor of the selfie camera 102. A user may view the preview 108 to assist the capture process by verifying the subject 110 appears as the user would like before deciding to initiate capture. When the subject 110 appears exactly how the user would like in the preview 108, the user may capture a selfie image or other piece of content using the selfie camera 102 by remotely activating the selfie camera 102 using the user device 104. The preview 108 of the captured image is then sent by the selfie camera 102 to a user device 104 and displayed on a user device display. If the user is happy with how the selfie image or other piece of content turned out, the user may share the selfie image or other piece of content to a social media platform 112. If the user desires to capture another piece of content including the subject 110, the first piece of content may be saved on the user device 104 or discarded and the preview 108 changed from displaying a captured piece of content back to displaying a live video of the subject 110 and surrounding area.

The user device 104 may be a processor based device with memory, a display, and wired or wireless connectivity circuits that allow a user device 104 to communicate with the selfie camera 102 and/or the social media platform 112 and interact/exchange data with the selfie camera 102 and/or the social media platform 112 using a communications path 116. For example, the user device 104 may communicate a message to selfie camera 102 to capture a piece of content and receive a data file including the piece of content in response from the selfie camera 102. The image file may be displayed on a user device display as a preview 108. The user device may be a smartphone device, such as an Apple iPhone product or an Android OS based system, a personal computer, a laptop computer, a tablet computer, a terminal device, and the like. The user device 104 may have an application (e.g., a web app or a mobile app) that is executed by the processor of the user device 104 that may display visual information to a user including the preview 108 before and/or after image capture and a user interface for editing and/or sharing selfie content. One example user interface is shown below in FIGS. 5A-5M. The communications path 116 may include one or more wired or wireless networks/systems that allow the user device 104 to communicate with a social media platform 112 using a known data and transfer protocol. The social media platform may be any known social media application including Twitter, Facebook, Snapchat, Instagram, Wechat, Line, and the like.

FIG. 2 illustrates an example embodiment of a selfie video 200 system that may capture and share pieces of content including videos. To capture selfie videos and other pieces of content the selfie camera 102 connects to a user device 104 using one or more connections 114 (e.g., a Bluetooth, Wifi, or other wireless or wired connection). Once connected to the selfie camera 102 a user device 104 may receive a live video preview 108 of a subject 110 from the selfie camera and display the preview 108 on a user device display. The preview 108 may show the subject 110 and the area surrounding the subject 110 as captured by the image sensor in the selfie camera 102. Once the subject 110 appears as desired in the preview 108, videos and other pieces of content captured by the selfie camera 102 may be streamed to a video streaming platform 202. Remote control functionality included in an application (e.g., mobile app or web app) executed by the processor of the user device 104, may cause a selfie camera 102 to record and/or share selfie videos and other pieces of content on a video streaming platform 202. To share a piece of content on a video streaming platform, the selfie camera 102 may connect to a video streaming platform 202 using a communications path 116. User account information, including account name and login information, may be received from a user device 104 as part of the connection process. A user device connected to the selfie camera 102 may simultaneously connect to a video steaming platform 202 using a communications path 116. A direct communications path 116 between a user device 104 and a video streaming platform 202 and/or a selfie camera 102 and a video streaming platform 202 gives users full control over their user device 104 when live streaming video and other pieces of content (i.e., "going live") to a video streaming platform 202 because, in the selfie video system 200, the selfie camera 102 is the device streaming video and other pieces of content not the user device 104. Therefore, functionality of a user device 104 is not inhibited when a user live streams pieces of content to a video streaming platform 202 using the selfie video 200 system.

A user device 104 may communicate with the selfie camera 102 and/or video streaming platform 202 and interact and/or exchange data with the selfie camera 102 and/or the video streaming platform 202. For example, the user device 104 may communicate one or more messages to a selfie camera 102 to record and/or stream video and other pieces of content to a video streaming platform 202. In response, the selfie camera 102 may send a message (e.g., a push notification) to the user device 104 indicating a live video stream has started. A user device 104 connected to the video streaming platform 202 will then be able to view the live video stream provided by the selfie camera 102 on a user device display. The user device 104 may have an application (e.g., a web app or a mobile app) that is executed by the processor of the user device 104 that may display visual information to a user including a preview 108 before and/or after video recording and a user interface for streaming, editing, and/or sharing selfie content. The communications path 116 may include one or more wired or wireless networks/systems that allow a user device 104 and/or a selfie camera 102 to communicate with a video streaming platform 202 using a known data and transfer protocol. The video streaming platform 202 may include one or more video streaming servers for receiving videos and other pieces of content from a selfie camera 102 and a plurality video streaming clients for distributing videos and other pieces of content from the video streaming server. To facilitate sharing live video content, one or more communications paths 116 and/or video streaming platforms 202 may include a content distribution network for distributing video content from one or more video streaming servers to a plurality of video streaming clients. The video streaming platform 202 may be any known video streaming application including Twitch, TikTok, Houseparty, Youtube, Facebook, Snapchat, Instagram, Wechat, Line, and the like.

Figure 3:
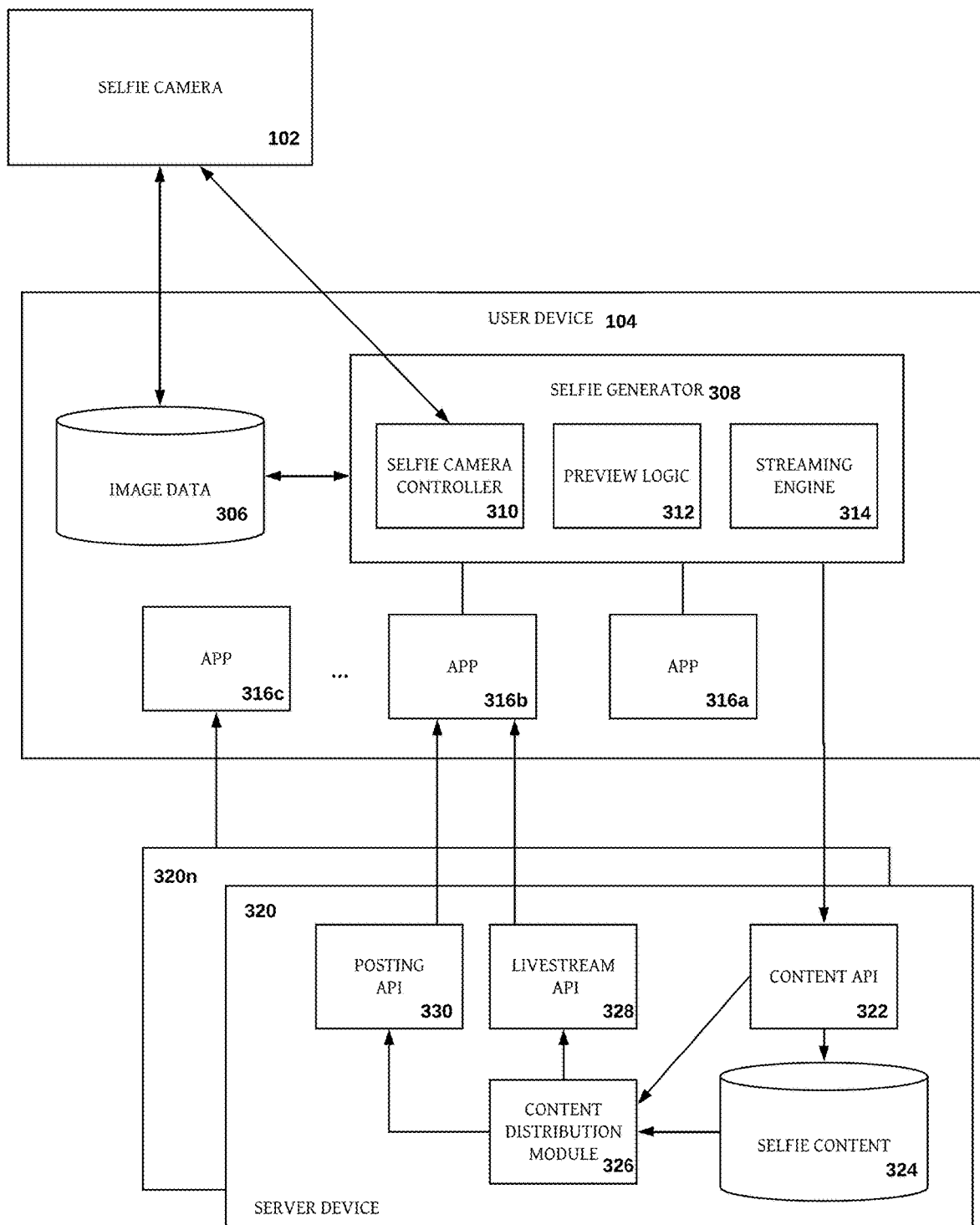
FIG. 3 illustrate more details of portions of the systems shown in FIGS. 1-2.

FIG. 3 illustrates more details of the systems shown in FIGS. 1-2 and specifically more details of the user device 104 and a server device 320 that may be incorporated into at least one of the social media platform 112 and/or the video streaming platform 202. The components shown in FIG. 3 provide the functionality delivered by the hardware devices shown in FIGS. 1-2. As used herein, the term "component" may be understood to refer to computer executable software, firmware, hardware, and/or various combinations thereof. It is noted that where a component is a software and/or firmware component, the component is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component. Further, the components may be implemented across multiple devices or other components local or remote to one another. Additionally, the components may be moved from one device and added to another device or may be included in both devices.

As shown in FIG. 3, a user device 104 may be communicatively coupled to a selfie camera and specifically receive pieces of content (e.g., data files including image data, audiovisual data, and the like) and send and receive messages. Pieces of content received from the selfie camera 102 may be stored in an image data store 306 included in a user device 104. The image data store 306 may store data files including pieces of content in various ways including, for example, as a flat file, indexed file, hierarchical database, relational database, unstructured database, graph database, object database, and/or any other storage mechanism. The image data store 306 may be implemented as a portion of the user device 104 hard drive or flash memory (e.g., NAND flash memory in the form of eMMCs, universal flash storage (UFS), SSDs etc.). To capture and process pieces of content, a user device 104 may include a selfie generator 308. In various embodiments, the selfie generator 308 may be implemented as a stand-alone mobile app installed on a user device, a stand-alone web app accessible by a web browser application, and/or as a plug-in or other extension of another mobile app installed on a user device (e.g., a naïve camera app, photo app, photo editing app, and the like) or web app accessible through a web browser. The selfie generator 308 may be communicatively coupled to a selfie camera 102 and a plurality of other apps (316a, 316b, 316c, etc.) that are executed by a processor of a user device 104.

In various embodiments, the selfie generator 308 includes a selfie camera controller 310, preview logic 312, and a streaming engine 314. The selfie camera controller 310 may send and receive messages and other data from the selfie camera to control camera functionality. For example, the selfie camera controller 310 may receive a message from a selfie camera 102 indicating with selfie camera 102 is powered on and located close enough to the user device 104 to establish a connection. In response, the settle camera controller 310 may send a message containing a connection request to establish a communication path with a selfie camera 102. The selfie camera controller 310 may send messages including commands for adjusting one or more camera settings (e.g., zoom, flash, aperture, aspect ratio, contrast, etc.) of the selfie camera 102. The selfie camera controller 310 may send messages including commands causing the selfie camera 102 to record video, stream video, and/or capture images. The selfie camera 102 executes the commands and then distributes captured pieces of content to an image data store 306. In various embodiments, the settle camera controller 310 by execute one or more capture routines for controlling capture of selfie images, selfie videos, and other pieces of content by the selfie camera 102. Capture routines may cause the selfie camera 102 and/or user device 104 to provide a visual or auditory countdown signaling when capture is about to take place. For example, a capture routine may include a 3 to 10 second countdown that incorporates displaying a countdown sequence of numbers number per second) on a user device display. The countdown may also include an audio component that audibly counts backward from, for example, 10 to 1. The audio component may be in sync with the user device display so that when the number displayed on the user device display is counted in the audio component. At the conclusion of the countdown, the selfie camera controller 310 may initiate capture of one or more pieces of content. One or more delays can be included in a capture routine to provide additional time to between competing the countdown and initiating capture of one or more pieces of content. Capture routines executed by the selfie camera controller 310 may capture a sequence of, for example, 2 to 5 photos with each captured photo displayed in a preview shown on a user device display.

In various embodiments, when executing a command to stream video and/or other pieces of content, the selfie camera 102 may initiate a connection with a sever device 320 (e.g., a streaming platform server) of a video streaming platform. Once connected to a server device 320 the selfie camera 102 may stream selfie videos and other pieces of content to the server device 320) for distribution to a plurality of streaming platform clients. In various embodiments, the selfie camera 102 may also provide video and other pieces of content for streaming to an image data store 306. The streaming engine 314 may retrieve video and other pieces of content for streaming from the image data store 306 and transfer the video and other pieces of content for streaming to a content API 322 using file/data lossless transfer protocols such as HTTP, HTTPS or FTP. Video and other pieces of content for streaming may then be provided to a content distribution module 326 for distribution to a plurality of clients through a livestream API 328 and/or stored a selfie content database 324. In various embodiments a content distribution module 326 and/or a livestream API 328 may include a media codec (e.g., audio and/or video codec) having functionality for encoding video and audio and other pieces of content received from a selfie camera 102 and or user device 104 into a format for streaming (e.g., an audio coding format including MP3, Vorbis, AAC, Opus, and the like and/or a video coding format including 11.264, HEVC, VP8 or VP9) using a known streaming protocol (e.g., real time streaming protocol (WISP), real-time transport protocol (RIP), real-time transport control protocol (RTCP), and the like) The content distribution module 326 and/or livestream API 328 may then assemble encoded video streams in a container bitstream (e.g., MP4, WebM, ASF ISMA, and the like) that is provided by the livestream API 328 to a plurality of streaming clients using a known transport protocol (e.g., RTP, RTMP, IRS by Apple, Smooth Streaming by Microsoft, MPEG-DASH by Adobe, and the like) that supports adaptive bitrate streaming over HTTP or other k web data transfer protocol.

The selfie generator 308 may connect to one or more mobile or web apps 316b, 316a executed by a processor of the user device. In various embodiments, preview logic 312 may parse one or more GUIs included in a mobile app and or web app to capture the size, resolution and other characteristics of pieces of content displayed on a social media platform and/or video streaming platform. For example, preview logic 312 may parse HTML, CSS, XML, JavaScript, and the like elements rendered as web app GUIs to extract characteristics (e.g., size, resolution, aspect ratio, and the like) of pieces of content displayed in web app implementations of social media platforms and/or video streaming platforms. Preview logic 312 may extract characteristics of pieces of content displayed in mobile app implementations of social media platforms and/or video streaming platforms by parsing Swift, Objective C, and the like elements (for iOS apps) and/or Java, C, C++, and the like elements (for Android apps). To create a realistic preview of how a piece of content will look on a social media platform and/or video streaming platform, preview logic 312 may include instructions for modifying images, videos, and other pieces of content received from the selfie camera to mirror the characteristics of images, videos, and other pieces of content displayed on one or more social media platforms and/or video streaming platforms. For example, preview logic 312 may crop a piece of content to a size and/or aspect ratio that matches the size and/or aspect ratio of pieces of content displayed in a particular GUI (e.g., post GUI, content feed GUI, live stream GUI, and the like) included in a web app and/or mobile app implementation of a social media and/or video streaming platform. Preview logic 312 may also change the resolution of one or more pieces of content received from a selfie camera to match the resolution of pieces of content displayed in a particular GUI included in a web app and/or mobile app implementation of a social media and/or video streaming platform.

Preview logic 312 can include functionality for configuring previews projected on a user device display to match the orientation of the user device display. For example, preview logic 312 may access a motion sensor (e.g., gyroscope, accelerometer, and the like) included in a user device 104 to determine the orientation of a user device display. Preview logic 312 may then crop the live video feed preview and/or captured piece of content received from the selfie camera 102 to fit the aspect ratio of the user device display at its current orientation. Preview logic 312 may dynamically crop the previews and/or captured piece of content from the selfie camera 102 to match the orientation of the user device display to dynamically change the aspect ratio of the previews and/or captured pieces of content, for example, from portrait to landscape when the user device display rotates from a portrait orientation to a landscape orientation. Post capture, preview logic 312 may display pieces of content as full view content with no cropping, portrait content cropped to a portrait aspect ratio, landscape content cropped to a landscape aspect ratio, and shared content cropped to match one or more GUIs for sharing pieces of content included in a social media and/or video streaming platform. In various embodiments, preview logic 312 may incorporate one or more characteristics of pieces of content extracted from a social media and/or video streaming platform into portrait and/or landscape content. For example, preview logic 312 may modify portrait content to simulate cropping that occurs when sharing one or more pieces of content on a content streaming GUI (e.g., Snapchat snaps, Instagram stories, Facebook stories, and the like) included in a social media and/or video streaming platform. Preview logic 312 may modify landscape content to simulate cropping that occurs when sharing one or more wide angle pieces of content (e.g., a group photo/video captured in a landscape orientation) to a social media and/or video streaming platform. Full view content and/or pieces of content modified by preview logic 312 into portrait content and/or landscape content may be saved to the image data store 306 and/or provided to a content API 322 of a server device 320 using as file/data lossless transfer protocols such as HTTP, HTTPS or FTP. Pieces of content received by a content API 322 may be shared to a social media and/or video streaming platform through a posting API 330.

In various embodiments, preview logic 312 may include one or more routines for editing previews and captured pieces of content. Preview logic 312 may edit captured video by segmenting recorded video and other pieces of content into clips (i.e., 1 to 30 second segments). One or more routines for editing video clips and other pieces of content may also be included in preview logic 312. In various embodiments, preview logic 312 may edit video clips and other pieces of content using one or more video editing filters. For example, preview logic 312 can include editing filters that pan within a scene in any direction (e.g., horizontal, vertical, diagonal, and the like); zoom in to and/or zoom out from one more areas of a scene; show movement within a scene in slow motion; and sync one or more audio clips with playback of a video clip. Preview logic 312 may combine one or more editing filters to enable more advanced editing functionality. For example, preview logic 312 may combine a slow motion editing filter with an audio sync editing filter to sync one or more audio clips with playback of a video clip having a slow motion effect to mask the ambient sound distortion that may occur when a slow motion editing filter is applied to a video clip having audio. In various embodiments, preview logic 312 may apply one or more editing filters post capture by first defining a portion of a scene included in a captured video or other piece of content to manipulate with a editing filter. For example, defining a rectangle at the center of the captured video. One or more editing filters may then be applied to manipulate the aspects of a scene within the rectangle (e.g., zoom in on an object within the rectangle, pan from left to right across the objects within the rectangle, and the like). In various embodiments, preview logic 312 may apply one or more stabilization and/or sharpening functions to livestream video, recorded video, recorded video clips, and other pieces of content. For example, a stabilization function may smooth out vibrations and other undesired movement included in recorded scenes and other pieces of content. A sharpening function may reduce blurring of moving objects captured in record scenes and other pieces of content. In various embodiments, preview logic 312 can include one or more background filters that may be applied to change the background of previews or captured pieces of content. To change the background of a piece of content to one or more background filters, preview logic 312 may include instructions for segmenting the background and foreground aspects of a preview and/or captured piece of content. The background elements of one or more captured pieces of content and/or live video previews may then by extracted and replaced with one or more background filters. Background filters may be actual photographs to simulate real like settings and/or virtual scenes simulating virtual reality or mixed reality environments. Pieces of content modified according to one or more editing functionalities of the preview logic 312 may be saved in the image date store 306 and/or provided to a content API 322 of a server device 320 using as file/data lossless transfer protocols such as HTTP, HTTPS or FTP. Pieces of content received by a content API 322 may be shared to a social media and/or video streaming platform using a posting API 330.

Figure 4:
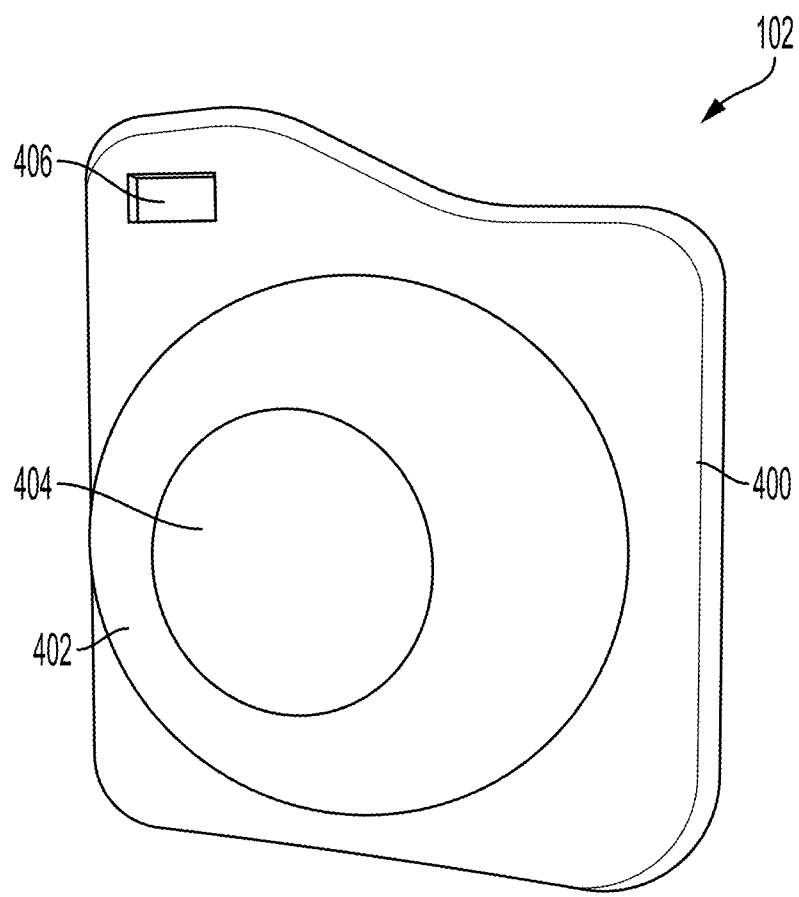
FIG. 4 illustrates an exemplary camera device used to capture selfie content.

FIG. 4 illustrates one example embodiment of a selfie camera 102. The selfie camera 102 may include a housing 400 disposing a circuit board including the electrical components (e.g., processor, control circuits, power source, image sensor, and the like) of the selfie camera 102. The housing 400 may be include an eye portion 402 extending laterally out from the surface of the housing. The eye portion 402 may dispose one or more camera components (e.g., lens, image sensor, and the like). At one end the eye portion 402 includes an opening 404 to allow light to pass through the lens and reach the image sensor disposed inside the housing 400 and/or eye portion 402. An LED light 406 may be embedded in an exterior surface of the housing 400 to provide additional light (i.e., flash) to enable capture of selfie content in low light conditions. More details about the components of the selfie camera 102 are described in FIGS. 13-14. One or more mounting systems may be attached to the backside of the housing 400 opposite the eye portion 402. The mounting systems may fix the selfie camera 102 to one or more foreign surfaces to position the selfie camera 102 for capturing selfie content. Specific exemplary mounting systems are described below in FIGS. 6-8D.

Figure 5A:
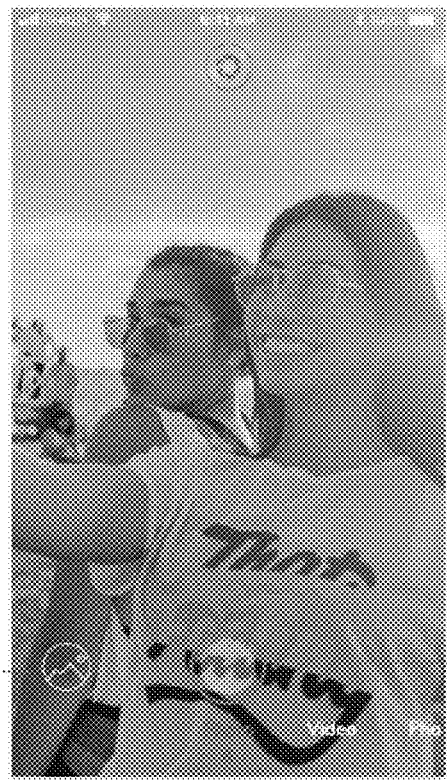
FIG. 5A-M illustrate exemplary preview screens for previewing selfie content.
Figure 5B:
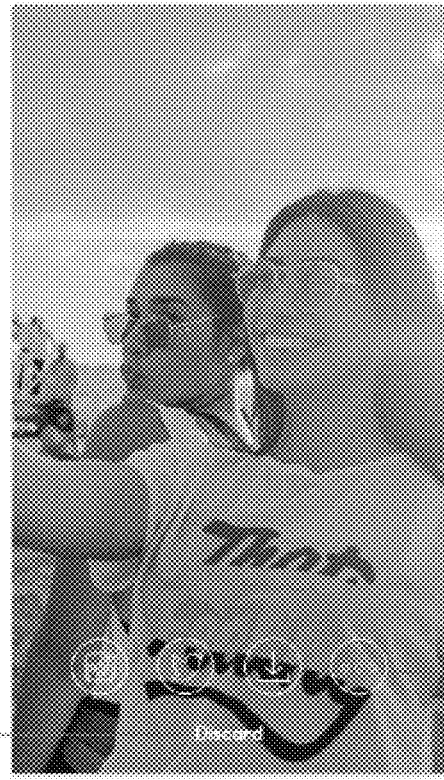

FIGS. 5A-M illustrate exemplary preview GUIs rendered by the selfie generator. The preview GUIs display previews of selfie content before and after capture. Selfie content displayed in preview GUIs is provided to a user device from a selfie camera connected to the user device. Selfie content displayed in preview GUIs may be modified to simulate one or more characteristics of selfie content shared on one or more social medial platforms and/or video streaming platforms. FIGS. 5A-B illustrate exemplary image preview GUIs for previewing image selfie content provided by a selfie camera. FIG. 5A illustrates an exemplary live image preview GUI displaying a live video of a scene provided by a selfie camera. The photo preview mode is clearly shown in the bottom portion of the image preview GUI. Inputting a capture command to the selfie camera controller that results in a captured image will render the exemplary captured image preview GUI shown in FIG. 5B on a user device display. From the captured image preview GUI, image selfie content received from the selfie camera may be deleted, saved to a user device image data store, shared to a social media platform, shared through a messaging platform, saved to a cloud storage instance, set as a wallpaper, and/or copied to a user device clipboard. Any action taken on the image preview GUI may result in rendering the live image preview GUI on a user device display.

Figure 5E:
Figure 5D:
Figure 5C:
Figure 5H:
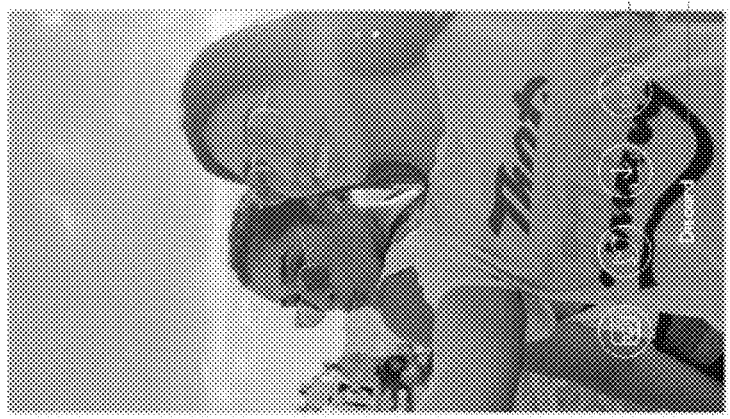

FIGS. 5C-E illustrate exemplary video preview GUIs for previewing video selfie content provided by a selfie camera.

FIG. 5C illustrates a live video preview GUI displaying live video of a scene provided by a selfie camera. The video preview mode is clearly shown in the bottom portion of the video preview GUI. Inputting a record video and/or live stream video command to the selfie camera controller that results in a recorded and/or live streamed video will render the exemplary video recording preview GUI shown in FIG. 5D on a user device display. For live streamed video, the video recording preview GUI may show selfie video content exactly it is shown on a live stream shared over a social media and/or video streaming platform. Inputting a stop recording command into the video recording preview GUI will display the exemplary captured video preview GUI shown in FIG. 5E. From the captured video preview GUI, video selfie content received from the selfie camera may be deleted, saved to a user device image data store, saved to a cloud storage device or other remote data store, set as a wallpaper, shared to a social medial and/or video streaming platform, shared through a messaging platform, and/or coped to a user device clipboard. Any action taken on the captured video preview GUI may result in rendering the live video preview GUI on a user device display.

Figure 5G:
Figure 5F:
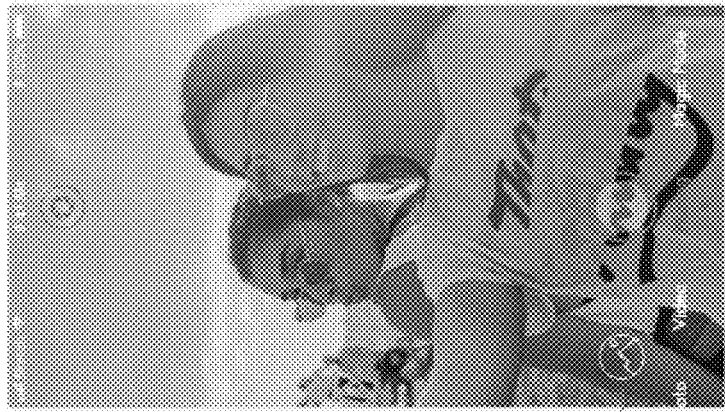
Figure 5K:
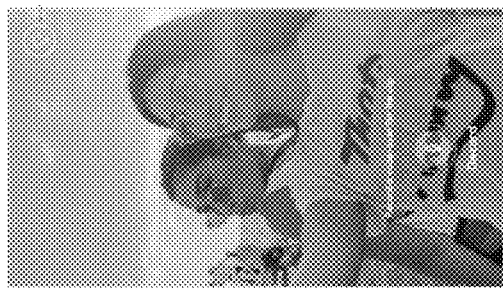
Figure 5J:
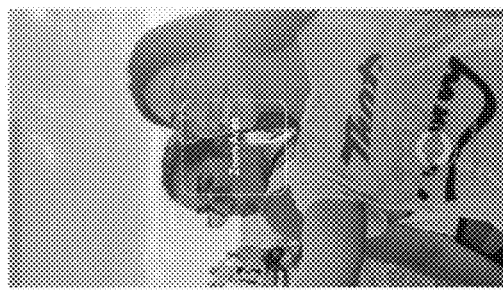

FIGS. 5F-G illustrate exemplary image sequence preview GUIs for previewing image selfie content provided by a selfie camera before and after performing a capture sequence generated by the selfie camera controller. FIG. 5F illustrates an exemplary live image sequence preview GUI displaying a live video of a scene provide by a selfie camera. The live image sequence preview GUI shows the scene as it will be captured by the selfie camera during execution of a capture sequence. Inputting a capture command to the selfie camera controller that results in performance of a capture sequence will render the exemplary captured image sequence preview GUI shown in FIG. 5G. In various embodiments, the captured image sequence preview GUI may show the first image captured in the capture sequence as a large preview taking up most of the GUI with all the images, in this example 5, captured in the image sequence shown as smaller previews in a bottom portion of the GUI. Selecting one of the smaller previews may display the selected image in the large preview portion of the GUI. More than one photo may be selected in the smaller previews to enable users to take action on more than one photo captured in the capture sequence. Confirming selection of one or more photos will render a captured image sequence action GUI shown in FIG. 5H for each confirmed selected image. In various embodiments, the functionality of the captured image sequence action GUI is the same as the captured image preview GUI in FIG. 5B. When two or more images captured in the image sequence are selected and confirmed taking action on the first photo in the captured image preview GUI may render a captured image preview GUI for the second photo and so on. If only one image captured in the image sequence is selected and confirmed, taking action on the photo may render the live image sequence preview GUI.

Figure 5I:
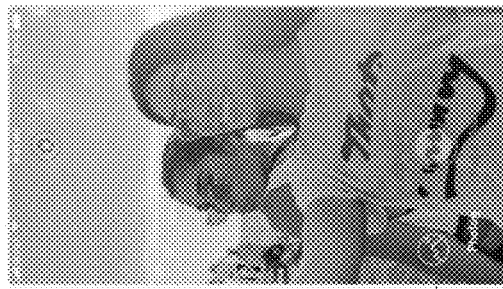
Figure 5M:
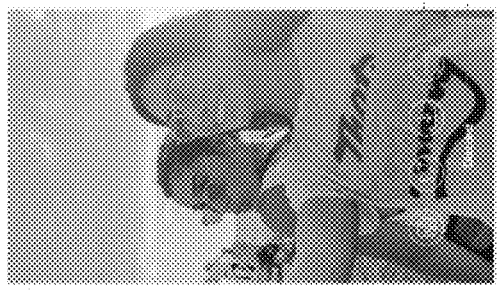
Figure 5L:
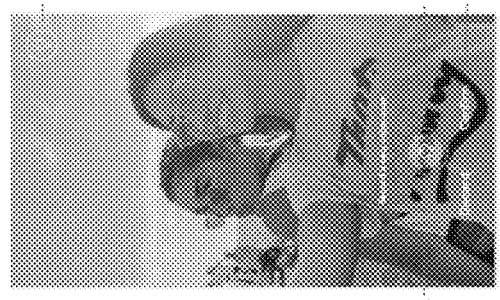

FIGS. 5I-M illustrate exemplary content editing preview GUIs for previewing and editing captured selfie content. FIG. 5I illustrates an exemplary content editing live preview GUI displaying live video of a scene provided by a selfie camera. The content editing live preview GUI shows the scene as it will be captured by the selfie camera during execution of a capture command. Inputting a capture and/or video edit command to the selfie camera controller resulting in capture of selfie content will render a define edit area GUI shown in FIG. 5J. In various embodiments, the define edit area preview GUI may include a box defining an area within which one or more effects (e.g., zoom, pan, slow motion, and the like) may be added to edit selfie content. Inputting a capture and/or audio edit command into the selfie camera controller resulting in capture of selfie content will render a record audio edit GUI shown in FIG. 5K. In various embodiments, the record audio edit GUI may record an audio clip that may be synced with selfie content. Recording an audio clip may result in rendering a recorded audio edit preview GUI shown in FIG. 5L. A preview of the recorded audio clip played over the audio of captured selfie content may be displayed in the audio edit preview GUI as well as options for confirming the recorded audio clip for use in content editing and/or recording a new audio clip. Selecting a record new audio clip may transition back to a record audio edit GUI. Confirming use of the record audio clip may transition to an edited captured content preview GUI shown in FIG. 5M. Selfie content including video effects edits added in the define edit area GUI and/or audio edits added in the record audio edit GUI may be previewed in the edited captured content preview GUI. From the edited captured content GUI, selfie content received from the selfie camera and/or edited by the selfie generator may be deleted, saved to a user device image data store, saved to a cloud storage device or other remote data store, set as a wallpaper, shared to a social medial and/or video streaming platform, shared through a messaging platform, and/or coped to a user device clipboard. Any action taken on the edited capture content GUI may result in rendering the content editing live preview GUI on a user device display.

Figure 6:
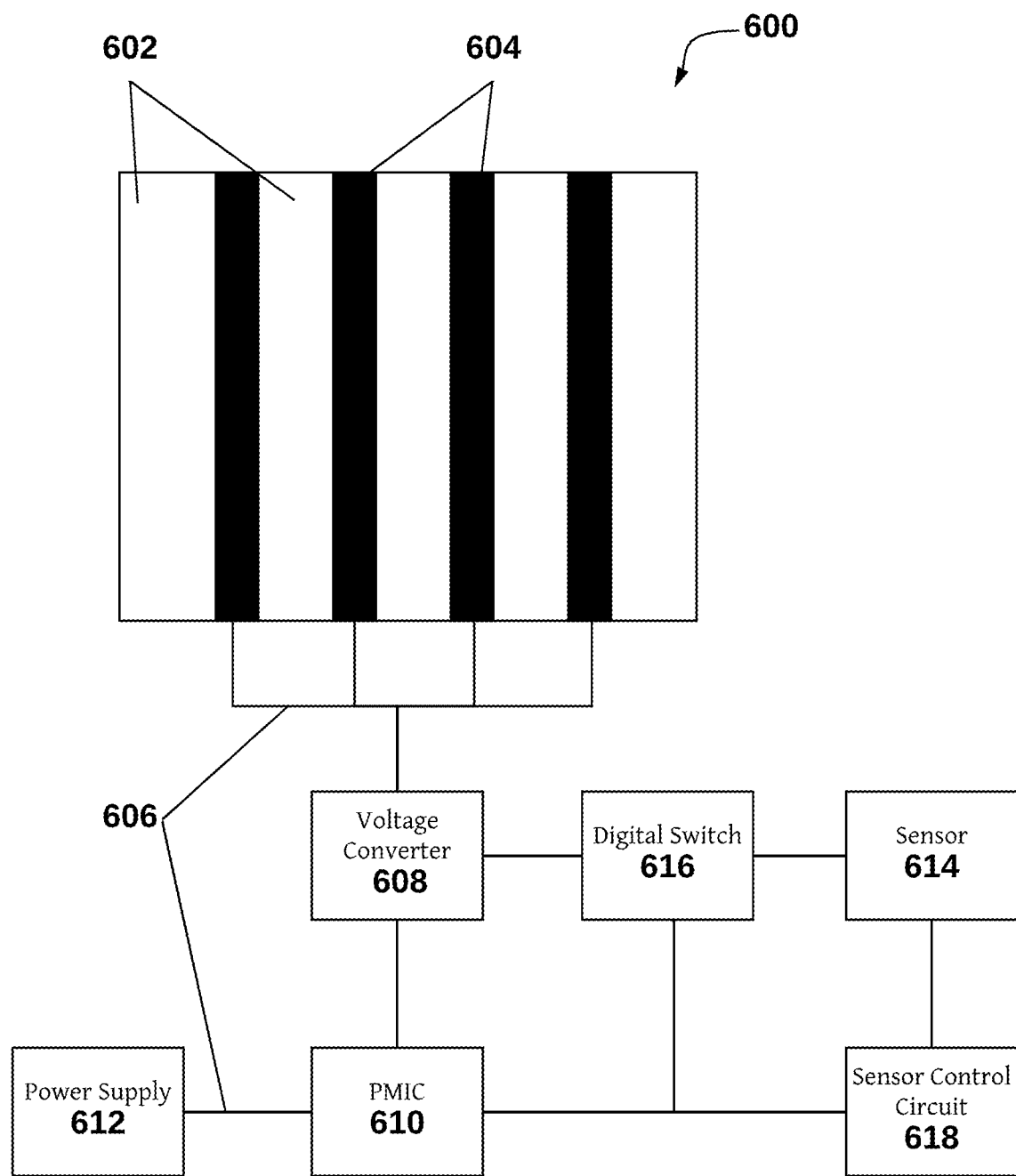
FIG. 6 illustrates an exemplary electro adhesion system for mounting a camera device shown in FIG. 4.

FIGS. 6-8D illustrate exemplary mounting systems that, may be used to fix a selfie camera to a foreign object. Mounting systems may be removably attached and/or built into the back of the settle camera to enable quick and secure attachment to a variety of surfaces. Attaching a selfie camera using a mounting system improves the perspective of scenes captured by the selfie camera. FIGS. 6-7B pertain to electroadhesion mounting systems and FIGS. 8A-D illustrate exemplary mechanical mounting systems.

FIG. 6 illustrates and electroadhesion device 600 that may be integrated with and or otherwise attached to the selfie camera. In various embodiments, the electroadhesion device 600 can be implemented as a compliant film comprising one or more electrodes 604 and an insulating material 602 between the electrodes 604 and a case and/or device (i.e., the selfie camera). The electroadhesive film may include a chemical adhesive applied to the insulating material 602 and/or electrodes 604 to allow the electroadhesion device 600 to be attached to a case and/or device. Additional attachment mechanisms used to secure the electroadhesion device 600 to a case and/or device can include a mechanical fastener, a heat fastener (e.g., welded, spot welded, or spot-melted location); dry adhesion; Velcro; suction/vacuum adhesion; magnetic or electromagnetic attachment or tape (e.g.: single- or double-sided). Depending on the degree or device portability desired or needed for a given situation and the size of the electroadhesion device, the attachment mechanism may create a permanent, temporary, or even removable form of attachment.

The insulating material 602 may be comprised of several different layers of insulators. For purposes of illustration, the electroadhesion device 600 is shown as having four electrodes in two pairs, although it will be readily appreciated that more or fewer electrodes can be used in a given electroadhesion device 600. Where only a single electrode is used in a given electroadhesion device 600, a complimentary electroadhesion device 600 having at least one electrode of the opposite polarity is preferably used therewith. With respect to size, electroadhesion device 600 is substantially scale invariant. That is, electroadhesion device 600 sizes may range from less than 1 square centimeter to greater than several meters in surface area. Even larger and smaller surface areas are also possible and may be sized to the needs of a given device.

In various embodiments, the electroadhesion device 600 may cover the entire rear surface of a device. One or more electrodes 604 may be connected to a power supply 612 (e.g., battery, AC power supply, DC, power supply and the like) using one or more known electrical connections 606. A power management integrated circuit 610 may manage power supply 612 output, regulate voltage, and control power supply 612 changing functions. To create an electroadhesive force that provides sufficient electroadhesive attraction to support a device, low voltage power from a power supply 612 must be converted into high voltage charges at the one or more electrodes 604 using a voltage converter 608. The high voltages on the one or more electrodes 604 form an electric field that interacts with a foreign object and or other target surface in contact with- and/or proximate to-the electroadhesion device 600. The electric field may locally polarize the target surface and/or induce electric charges on the target surface that are opposite to the charge on the one or more electrodes 604. The opposite charges on the one or more electrodes 604 and the target surface attract to cause electroadhesion between the electrodes 604 and the target surface. The induced charges may be the result of a dielectric polarization or from weakly conductive materials and electrostatic induction of charge. In the event that the target surface comprises a material that is a strong conductor, such as copper for example, the induced charges may completely cancel the electric field. In this case, the internal electric field is zero, but the induced charges nonetheless still form and provide electroadhesive force (i.e., Lorentz forces) to the electroadhesion device 600.

Thus, the adjustable voltage applied to the one or more electrodes 604 provides an overall electroadhesive force between the electroadhesion device 600 and the material of the foreign object and/or other target surface. The electroadhesive force holds the electroadhesion device 600 on the target surface. The overall electroadhesive force may be sufficient to overcome the gravitational pull on the electroadhesion device 600 and a consumer device or other object attached to the electroadhesion device 600. Therefore, the electroadhesive force may be used to hold a consumer device mounted with the electroadhesion device 600 aloft on the target surface. In various embodiments, a plurality of electroadhesion devices may be placed against target surface, such that additional electroadhesive forces against the target surface can be provided. The combination of electroadhesive forces may be sufficient to lift, move, pick and place, mount, or secure a large object on the target surface.

Removal of the adjustable voltages from the one or more electrodes 604 ceases the electroadhesive force between electroadhesion device 600 and the target surface. Thus, when there is no adjustable voltage between the one or more electrodes 104, the electroadhesion device 600 can move more readily relative to the target surface. This condition allows the electroadhesion device 600 to move before and after an adjustable voltage is applied. Well controlled electrical activation and de-activation enables fast adhesion and detachment, such as response times less than about 50 milliseconds, for example, while consuming relatively small amounts of power.

Applying too much voltage to certain materials (e.g., metals and other conductors) can cause sparks, fires, electric shocks, and other hazards. Applying too little voltage generates a weak electroadhesive force that is not strong enough to securely attach the electroadhesion device 600 to the target surface. To ensure the proper adjustable voltage is generated and applied to the electrodes 604 to generate a sufficient electroadhesive force, a digital switch 616 may autonomously control the voltage converter 608. The digital switch 616 may control the voltage output of the voltage converter 608 based on sensor data collected by one or more sensors 614 included in the electroadhesion device 600. The digital switch 616 may be a microcontroller or other integrated circuit including programmable logic for receiving sensor data, determining one or more characteristics based on the sensor data, and controlling the voltage converter based on the one or more characteristics. The digital switch 616 may operate the voltage converter 608 to generate, modify, set, and/or maintain an adjustable output voltage used to attach the electroadhesion device 600 to a target surface.

For example, in response to detecting a conductive target surface (e.g., metal) by the sensor 614, the digital switch 616 may cause the voltage convener 608 to generate an adjustable voltage sufficient to attach and secure the electroadhesion device 600 to the conductive target surface. The adjustable voltage output may also be safe to apply to conductive surfaces and may eliminate sparks, fires, or other hazards that are created when an electroadhesion device 600 that is generating a high voltage contacts and/or is placed close to a conductive target surface. Similarly, when the sensor 614 detects a different surface with different characteristics, the digital switch 616 controls the voltage converter 608 to generate a different adjustable voltage that is sufficient to attach and secure the electroadhesion device 600 to that different surface. For example, in response to detecting an organic target surface (e.g., wood, drywall, fabric, and the like) by the sensor 614, the digital switch 616 may cause the voltage converter 608 to generate an adjustable voltage that may be sufficient to attach and secure the electroadhesion device to the organic target surface without creating hazards. The adjustable voltage may also minimize the voltage output to avoid hazards that may be created when the electroadhesion device 600 is accidently moved. In response to detecting a smooth target surface (e.g., glass) or an insulating target surface (e.g., plastic, stone, sheetrock, ceramics, and the like) by the sensor 614, the digital switch 616 may cause the voltage convener 608 to generate an adjustable voltage sufficient to attach and secure the electroadhesion device 600 to the smooth and/or insulating target surface without creating hazards. Thus, the electroadhesion device 600 has an adjustable voltage level that is adjusted based on a characteristic of the target surface determined by the sensor 614 resulting in an electroadhesion device 600 that can be safely used to attach to various target surfaces without safety hazards.

The strength (i.e., amount of voltage) of the adjustable voltage may vary depending on the material of the target surface. For example, the strength of the adjustable voltage required to attach the electroadhesion device 600 to a conductive target surface (e.g., metal) may be less than the adjustable voltage required to attach the electroadhesion device 600 to an insulating target surface, a smooth target surface, and/or an organic target surface. The strength of the adjustable voltage required to attach the electroadhesion device 600 to an organic target surface may be greater than the adjustable voltage required to attach the electroadhesion device 600 to a conductive target surface and less than the adjustable voltage require to attach the electroadhesion device 600 to an insulating target surface. The strength of the adjustable voltage required to attach the electroadhesion device 600 to an insulating target surface may be higher than the adjustable voltage required to attach the electroadhesion device 600 to an organic target surface or a conductive target surface. The electroadhesion device 600 may be configured to attach to any type of surface (e.g., metallic, organic, rough, smooth, undulating, insulating, conductive, and like). In some embodiments, it may be preferable to attach the electroadhesion device 100 to a smooth, flat surface.

Attaching the electroadhesion device 600 to some target surfaces requires a very high voltage. For example, a very high voltage output may be required to attach the electroadhesion device 600 to a rough target surface, a very smooth target surface (e.g., glass), and/or an insulating target surface. An electroadhesion device 600 generating a high voltage output may generate sparks, fires, electric shock, and other safety hazards when placed into contract with- and/or in close proximity to- conductive surfaces. To avoid safety hazards, some embodiments of the electroadhesion device 600 may not generate a high voltage and may only generate an output adjustable voltage sufficient to attach the electroadhesion device 600 to conductive target surfaces, organic target surfaces, and the like.

When the electroadhesion device 600 is moved to a new target surface, the sensor 614 may automatically detect one or more characteristics of the new target surface and/or determine the material type, surface texture, surface morphology, or other characteristic for the new target surface. The digital switch 616 may then modify and/or maintain the adjustable voltage output generated by the voltage converter 608 based on the material type and/or characteristics for the new target surface. To determine the adjustable voltage to generate using the voltage converter 608, the digital switch 616 may include logic for determining the adjustable voltage based on sensor data received from the sensor 614. For example, the digital switch 616 may include logic for using a look up table to determine the proper adjustable voltage based on the sensor data. The logic incorporated into the digital switch 616 may also include one or more algorithms for calculating the proper adjustable voltage based on the sensor data. Additionally, if the sensor 614 detects the electroadhesion device 600 is moved away from a target surface, the digital switch 616 may power down the voltage converter 608 and/or otherwise terminate the adjustable voltage output from the voltage converter 608 until a new target surface is detected by the sensor 614.

The one or more sensors 614 can include a wide variety of sensors 614 for measuring characteristics of the target surface. Each sensor 614 may be operated by a sensor control circuit 618. The sensor control circuit 618 may be included in the sensor 614 or may be a distinct component. The sensor control circuit 618 can be a microcontroller or other integrated circuit having programmable logic for controlling the sensor 614. For example, the sensor control circuit 618 may initiate capture of sensor data, cease capture of sensor data, set the sample rate for the sensor, control transmission of sensor data measured by the sensor 614, and the like. Sensors 614 can include conductivity sensors (e.g., electrode conductivity sensors, induction conductivity sensors, and the like); Hall effect sensors and other magnetic field sensors; porosity sensors (e.g., time domain reflectometry (TDR) porosity sensors); wave form sensors (e.g., ultrasound sensors, radar sensors, infrared sensors, dot field projection depth sensors, time of flight depth sensors); motion sensors; surface texture sensors; surface profile sensors, surface morphology sensors, and the like. Sensor data measured by the one or more sensors 614 may be used to determine one or more characteristics of the target surface. For example, sensor data may be used to determine the target surface's conductivity and other electrical or magnetic characteristics; the material's porosity, permeability, and surface morphology; the materials hardness, smoothness, surface profile, and other surface characteristics; the distance the target surface is from the sensor; and the like. One or more characteristics determined from sensor data may be used to control the digital switch 616 directly. Sensor data may also be sent to a data analysis module. The data analysis module may refine the sensor data and use it to determine a characteristic and/or material type (e.g., metal, wood, plastic, ceramic, concreate, drywall, glass, stone and the like) for the target surface. The digital switch 616 may then control the voltage output from the voltage converter 608 based on the characteristic and/or material type for the target surface determined by the data analysis module.

The digital switch 616 may function as an essential safety feature of the electroadhesion device 100. The digital switch 616 may reduce the risk of sparks, fires, electric shock, and other safety hazards that may result from applying a high voltage to a conductive target surface. By autonomously controlling the voltage generated by the electroadhesion device 600, the digital switch 616 may also minimize human error that may result when a user manually sets the voltage output of the electroadhesion device 600. For example, human errors may include a user forgetting to change the voltage setting, a child playing with the electroadhesion device and not paying attention to the voltage setting, a user mistaking a conductive surface for an insulating surface, and the like. These errors may be eliminated by using digital switch 616 to automatically adjust the voltage generated by the voltage converter 608 based on sensor data received from the one or more sensors 614 and/or material classifications made by the data analysis module.

As shown in FIG. 7A, to promote safely and improve user experience, the selfie camera 102 and or electroadhesion device 600 may include a mechanism (e.g., button, mechanical switch, element, and the like) 716 for actuating the sensor 614 and/or digital switch 616. The sensor 614 and digital switch 616 may also be automatically turned on when the electroadhesion device 600 and/or the selfie camera 102 is powered on. The electroadhesion device 600 and/or selfie camera 102 may also include a signaling mechanism (e.g., status light, UI element, mechanical switch, and the like) for communicating the status of the sensor 614 and/or digital switch 616 to a user of the electroadhesion device 600. The signaling mechanism may be used to communicate that the proper adjustable voltage for a particular target surface has been determined.

In various embodiments, the signaling mechanism may be a status light that is red when the sensor 614 and/or digital switch 616 is powered on and sensing the target surface material or other characteristics but has not determined the proper adjustable voltage for the target surface. The status light may turn green when the digital switch 616 has received the sensor data, determined the appropriate adjustable voltage for the particular target surface, and generated the proper adjustable voltage output and the electroadhesion device 600 is ready to attach to the target surface. The status light may also turn blinking red and/or yellow if there is some problem with determining the adjustable voltage for the particular target surface and/or generating the adjustable voltage output for the particular target surface. For example, the status light may blink red and/or turn yellow when the sensor 614 is unable to collect sensor data, the data analysis module is unable to determine a material type or other characteristic for the target surface material, the digital switch 616 is unable to operate the voltage converter 608, the voltage converter 608 is unable to generate the correct adjustable voltage, and the like.

As described herein, voltage generated by the voltage converter 608 is defined as a range of DC voltage of any one or more of the following from 250 V to 10,000 V; from 500 V to 10,000 V; from 1,000 V to 10,000 V; from 1,500 V to 10,000 V; from 2,000 V to 10,000 V; from 3,000 V to 10,000 V; from 4,000 V to 10,000 V; from 5,000 V to 10,000 V; from 6,000 V to 10,000 V; from 7,000 V to 10,000 V; from 250 V to 1,000 V; from 250 V to 2,000 V; from 250 V to 4,000 V; from 500 V to 1,000 V; from 500 V to 2,000 V; from 500 V to 4,000 V; from 1,000 V to 2,000 V; from 1,000 V to 4,000 V; from 1,000 V to 6,000 V; from 2,000 V to 4,000 V; from 2,000 V to 6,000 V; from 4,000 V to 6,000 V; from 4,000 V to 10,000 V; from 6,000 V to 8,000 V; and from 8,000 V to 10,000 V.

As described herein, voltage generated by the voltage converter 608 is defined as a range of AC voltage of any one or more of the following from 250 $V_{rms}$ to 10,000 $V_{rms}$; from 500 $V_{rms}$ to 10,000 $V_{rms}$; from 1,000 $V_{rms}$ to 10,000 $V_{rms}$; from 1,500 $V_{rms}$ to 10,000 $V_{rms}$; from 2,000 $V_{rms}$ to 10,000 $V_{rms}$; from 3,000 $V_{rms}$ to 10,000 $V_{rms}$; from 4,000 $V_{rms}$ to 10,000 $V_{rms}$; from 5,000 $V_{rms}$ to 10,000 $V_{rms}$; from 6,000 $V_{rms}$ to 8,000 $V_{rms}$; from 7,000 $V_{rms}$ to 8,000 $V_{rms}$; from 8,000 $V_{rms}$ to 10,000 $V_{rms}$; from 9,000 $V_{rms}$ to 10,000 $V_{rms}$; from 250 $V_{rms}$ to 1,000 $V_{rms}$; from 250 $V_{rms}$ to 2,000 $V_{rms}$; from 250 $V_{rms}$ to 4,000 $V_{rms}$; from 500 $V_{rms}$ to 1,000 $V_{rms}$; from 500 $V_{rms}$ to 2,000 $V_{rms}$; from 500 $V_{rms}$ to 4,000 $V_{rms}$; from 1,000 $V_{rms}$ to 2,000 $V_{rms}$; from 1,000 $V_{rms}$ to 4,000 $V_{rms}$; from 1,000 $V_{rms}$ to 6,000 $V_{rms}$; from 2,000 $V_{rms}$ to 4,000 $V_{rms}$; from 2,000 $V_{rms}$ to 6,000 $V_{rms}$; from 4,000 $V_{rms}$ to 6,000 $V_{rms}$; from 4,000 $V_{rms}$ to 8,000 $V_{rms}$; and from 6,000 $V_{rms}$ to 8,000 $V_{rms}$.

As described herein, voltage generated by the voltage converter 608 is defined as a range of DC voltage of any one or more of the following from about 250 V to about 10,000 V; from about 500 V to about 10,000 V; from about 1,000 V to about 10,000 V; from about 1,500 V to about 10,000 V; from about 2,000 V to about 10,000 V; from about 3,000 V to about 10,000 V; from about 4,000 V to about 10,000 V; from about 5,000 V to about 10,000 V; from about 6,000 V to about 8,000 V; from about 7,000 V to about 8,000 V; from about 250 V to about 1,000 V; from about 250 V to about 2,000 V; from about 250 V to about 4,000 V; from about 500 V to about 1,000 V; from about 500 V to about 2,000 V; from about 500 V to about 4,000 V; from about 1,000 V to about 2,000 V; from about 1,000 V to about 4,000 V; from about 1,000 V to about 6,000 V; from about 2,000 V to about 4,000 V; from about 2,000 V to about 6,000 V; from about 4,000 V to about 6,000 V; from about 4,000 V to about 8,000 V; from about 6,000 V to about 8,000 V; from about 8,000 V to about 10,000 V; and from about 9,000 V to about 10,000 V.

As described herein, voltage generated by the voltage converter 608 is defined as a range of AC voltage of any one or more of the following from about 250 $V_{rms}$ to about 10,000 $V_{rms}$; from about 500 $V_{rms}$ to about 10,000 $V_{rms}$; from about 1,000 $V_{rms}$ to about 10,000 $V_{rms}$; from about 1,500 $V_{rms}$ to about 10,000 $V_{rms}$; from about 2,000 $V_{rms}$ to about 10,000 $V_{rms}$; from about 3,000 $V_{rms}$ to about 10,000 $V_{rms}$; from about 4,000 $V_{rms}$ to about 10,000 $V_{rms}$; from about 5,000 $V_{rms}$ to about $V_{rms}$; from about 6,000 $V_{rms}$ to about 8,000 $V_{rms}$; from about 7,000 $V_{rms}$ to about 8,000 $V_{rms}$; from about 250 $V_{rms}$ to about 1,000 $V_{rms}$; from about 250 $V_{rms}$ to about 2,000 $V_{rms}$; from about 250 $V_{rms}$ to about 4,000 $V_{rms}$; from about 500 $V_{rms}$ to about 1,000 $V_{rms}$; from about 500 $V_{rms}$ to about 2,000 $V_{rms}$; from about 500 $V_{rms}$ to about 4,000 $V_{rms}$; from about 1,000 $V_{rms}$ to about 2,000 $V_{rms}$; from about 1,000 $V_{rms}$ to about 4,000 $V_{rms}$; from about 1,000 $V_{rms}$ to about 6,000 $V_{rms}$; from about 2,000 $V_{rms}$ to about 4,000 $V_{rms}$; from about 2,000 $V_{rms}$ to about 6,000 $V_{rms}$; from about 4,000 $V_{rms}$ to about 6,000 $V_{rms}$; from about 4,000 $V_{rms}$ to about 8,000 $V_{rms}$; from about 6,000 $V_{rms}$ to about 8,000 $V_{rms}$; from about 8,000 $V_{rms}$ to about 10,000 $V_{rms}$; and from about 9,000 $V_{rms}$ to about 10,000 $V_{rms}$.

As described herein, voltage output from the power supply 612 is defined as a range of DC voltage of any one or more of the following from 2.0 $V_{rms}$ to 249.99 $V_{rms}$; from 2.0 $V_{rms}$ to 150.0 $V_{rms}$; from 2.0 $V_{rms}$ to 100.0 $V_{rms}$; from 2.0 $V_{rms}$ to 50.0 $V_{rms}$; from 5.0 $V_{rms}$ to 249.99 $V_{rms}$; from 5.0 $V_{rms}$ to 150.0 $V_{rms}$; from 5.0 $V_{rms}$ to 100.0 $V_{rms}$; from 5.0 $V_{rms}$ to 50.0 $V_{rms}$; from 50.0 $V_{rms}$ to 150.0 $V_{rms}$; from 100.0 $V_{rms}$ to 249.99 $V_{rms}$; from 100.0 $V_{rms}$ to 130.0 $V_{rms}$; and from 10.0 $V_{rms}$ and 30.0 $V_{rms}$.

As described herein, voltage output from the power supply 612 is defined as a range of AC voltage of any one or more of the following from 2.0 $V_{rms}$ to 249.99 $V_{rms}$; from 2.0 $V_{rms}$ to 150.0 $V_{rms}$; from 2.0 $V_{rms}$ to 100.0 $V_{rms}$; from 2.0 $V_{rms}$ to 50.0 $V_{rms}$; from 5.0 $V_{rms}$ to 249.99 $V_{rms}$; from 5.0 $V_{rms}$ to 150.0 $V_{rms}$; from 5.0 $V_{rms}$ to 100.0 $V_{rms}$; from 5.0 $V_{rms}$ to 50.0 $V_{rms}$; from 50.0 $V_{rms}$ to 150.0 $V_{rms}$; from 100.0 $V_{rms}$ to 249.99 $V_{rms}$; from 100.0 $V_{rms}$ to 130.0 $V_{rms}$; and from 10.0 $V_{rms}$ and 30.0 $V_{rms}$.

As described herein, voltage output from the power supply 612 is defined as a range of DC voltage of any one or more of the following from about 2.0 V to about 249.99 V; from about 2.0 V to about 150.0 V; from about 2.0 V to about 100.0 V; from about 2.0 V to about 50.0 V; from about 5.0 V to about 249.99 V; from about 5.0 V to about 150.0 V; from about 5.0 V to about 100.0 V; from about 5.0 V to about 50.0 V; from about 50.0 V to about 150.0 V; from about 100.0 V to about 249.99 V; from about 100.0 V to about 130.0 V; and from about 10.0 V and 30.0 V.

As described herein, voltage output from the power supply 612 is defined as a range of AC voltage of any one or more of the following from about 2.0 $V_{rms}$ to about 249.99 $V_{rms}$; from about 2.0 $V_{rms}$ to about 150.0 $V_{rms}$; from about 2.0 $V_{rms}$ to about 100.0 $V_{rms}$; from about 2.0 $V_{rms}$ to about 50.0 $V_{rms}$; from about 5.0 $V_{rms}$ to about 249.99 $V_{rms}$; from about 5.0 $V_{rms}$ to about 150.0 $V_{rms}$; from about 5.0 $V_{rms}$ to about 100.0 $V_{rms}$; from about 5.0 $V_{rms}$ to about 50.0 $V_{rms}$; from about 50.0 $V_{rms}$ to about 150.0 $V_{rms}$; from about 100.0 $V_{rms}$ to about 249.99 $V_{rms}$; from about 100.0 $V_{rms}$ to about 130.0 $V_{rms}$; and from about 10.0 $V_{rms}$ and 30.0 $V_{rms}$.

FIGS. 7A-B illustrate a selfie camera 102 having an electroadhesion device 600 mounting system. In various embodiments, the electroadhesion device 600 may be used to mount the selfie camera to the target surface 714 of any foreign object 712 including walls, mirrors, trees, furniture, and the like. FIG. 7A illustrates a back surface 700 of a selfie camera 102 having an electroadhesion device 600, for example, a compliant electroadhesive film fixed to the back surface 700. FIG. 7B illustrates a side view of a selfie camera 102 mounted to a foreign object 710 using the electroadhesion device 600. The electroadhesion device 600 may include one or more sensors 614 for measuring one or more characteristics of the foreign object 710.

To attach the selfie camera 102 to the foreign object 710, the one or more sensors 614 determine a characteristic of the foreign object 710. Based on the sensor data, the electroadhesion device 600 applies an adjustable voltage to one or more electrodes 604, the adjustable voltage induces a local electric field 720 around the one or more electrodes 604 wherein opposite charges from the inner portion 712 of the foreign object 710 build up around the surface of the electrodes 604. The build-up of opposing charges creates an electroadhesive force between the electroadhesion device 600 attached to the selfie camera 102 and the foreign object 710. The electroadhesive force is sufficient to fix the selfie camera 102 to the target surface 714 of the foreign object 710 while the adjustable voltage is applied. It should be understood that the electroadhesion device 600 does not have to be in direct content with the target surface 714 of the foreign object 710 to produce the electroadhesive force. Instead, the target surface 714 of the foreign object 710 must be proximate to the electroadhesion device 600 to interact with the adjustable voltage on the one or more electrodes 604. The electroadhesion device 600 may, therefore, secure the selfie camera 102 to smooth, even surfaces as well as rough, uneven surfaces. Additionally, the portion of the electroadhesion device 600 including the one or more electrodes 604 may be curved, flat, and or have an adjustable surface to facilitate better contact with the target surface 714.

FIGS. 8A-D illustrate mechanical mounting systems that may be used with the selfie camera. Mechanical mounting systems that may secure the selfie camera 102 to one or more foreign objects include suction cups, mini suction cups, disposable sticky pads, magnets, and the like. Mechanical and/or electroadhesion mounting systems may be removably attached and/or permanently fixed to the selfie camera 102 using one or more hooks 800 included in a rear surface of the selfie camera 102. FIGS. 8B-D illustrate an exemplary suction cup mounting system including a suction cup 810 and a mounting plate 812 for securing the suction cup 810 to the selfie camera 102. The mounting plate may also include a pivot for changing the position (i.e., orientation, direction, perspective, and the like) of the selfie camera 102. In various embodiments the position of the selfie camera 102 may be changed when the selfie camera 102 is mounted to a foreign object my moving the selfie camera 102 about the pivot 814. FIG. 8B illustrates a perspective view of an exemplary suction cup 810 mounting system fixed to a selfie camera 102 using a mounting plate 812. FIG. 8C illustrates a flat top view of an exemplary suction cup 810 mounting system fixed to a selfie camera 102 using a mounting plate 812 having a pivot 814 at the base of the suction cup 810. FIG. 8D illustrates a flat front view of an exemplary suction cup 810 mounting system fixed to a selfie camera using a mounting plate 812.

Figure 9:
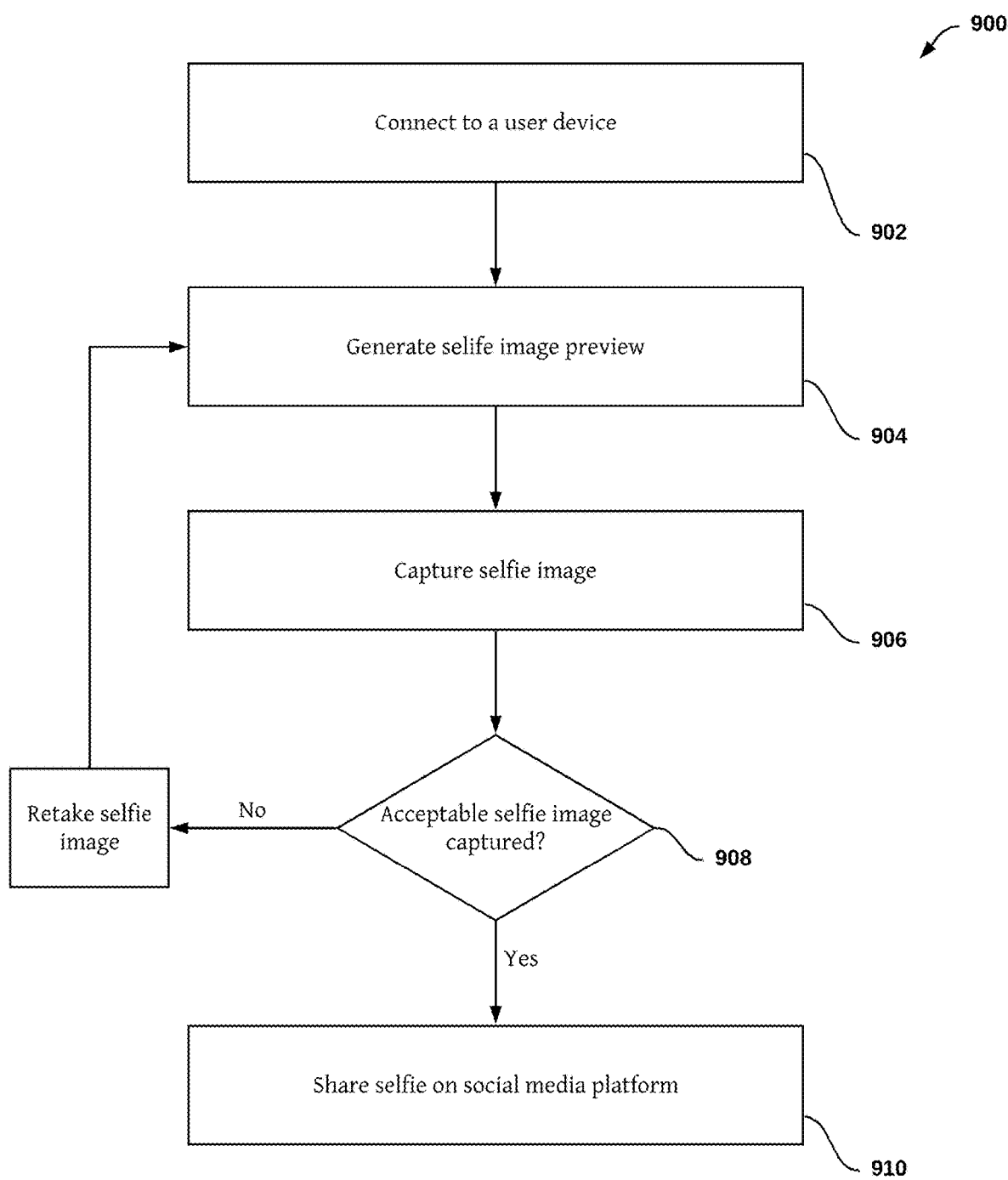
FIG. 9 is a flow diagram illustrating an exemplary process for capturing selfie content using the system shown in FIG. 1.

FIG. 9 illustrates and exemplary process 900 for capturing and sharing a selfie image using the selfie camera system shown in FIG. 1. At step 902, a selfie camera connects to a user device to establish a communication pathway for transferring messages and data. Once a connection is established, a selfie image preview may be provided to a user device, in step 904. The selfie image preview may be a live video stream of a scene as viewed by the selfie camera device. One or more aspects to the selfie image preview may be modified to simulate the appearance so selfie content on a social media and/or video streaming platform. At step 906, a selfie camera receives a capture command from a connected user device and captures a selfie image. The captured selfie image is sent to the connected user device using the connection pathway. At decision point 908, the quality of the selfie image is evaluated by viewing the preview of the selfie image provided by the selfie camera. If the selfie image shown in the preview is acceptable, the selfie image may be saved on a user device and/or shared on a social media platform by connecting to a social media platform using the user device and transferring the selfie image to the social media platform, at step 910. In various embodiments, the selfie generator providing the selfie image preview may automatically connect to a social media platform when a connection is established with the selfie camera device. Once the selfie generator is connected to a social media platform, selfie image previews may be shared on a social media platform directly from a selfie image preview GUI. If a selfie image shown in a selfie image preview is not acceptable, a selfie image may be discarded. To expediting retaking a selfie image, discarding a selfie image may automatically restarts the selfie capture process by generating a live selfie image preview, at step 904. Steps 904 through 908 may be repeated as many times as necessary to generate an acceptable selfie image.

Figure 10:
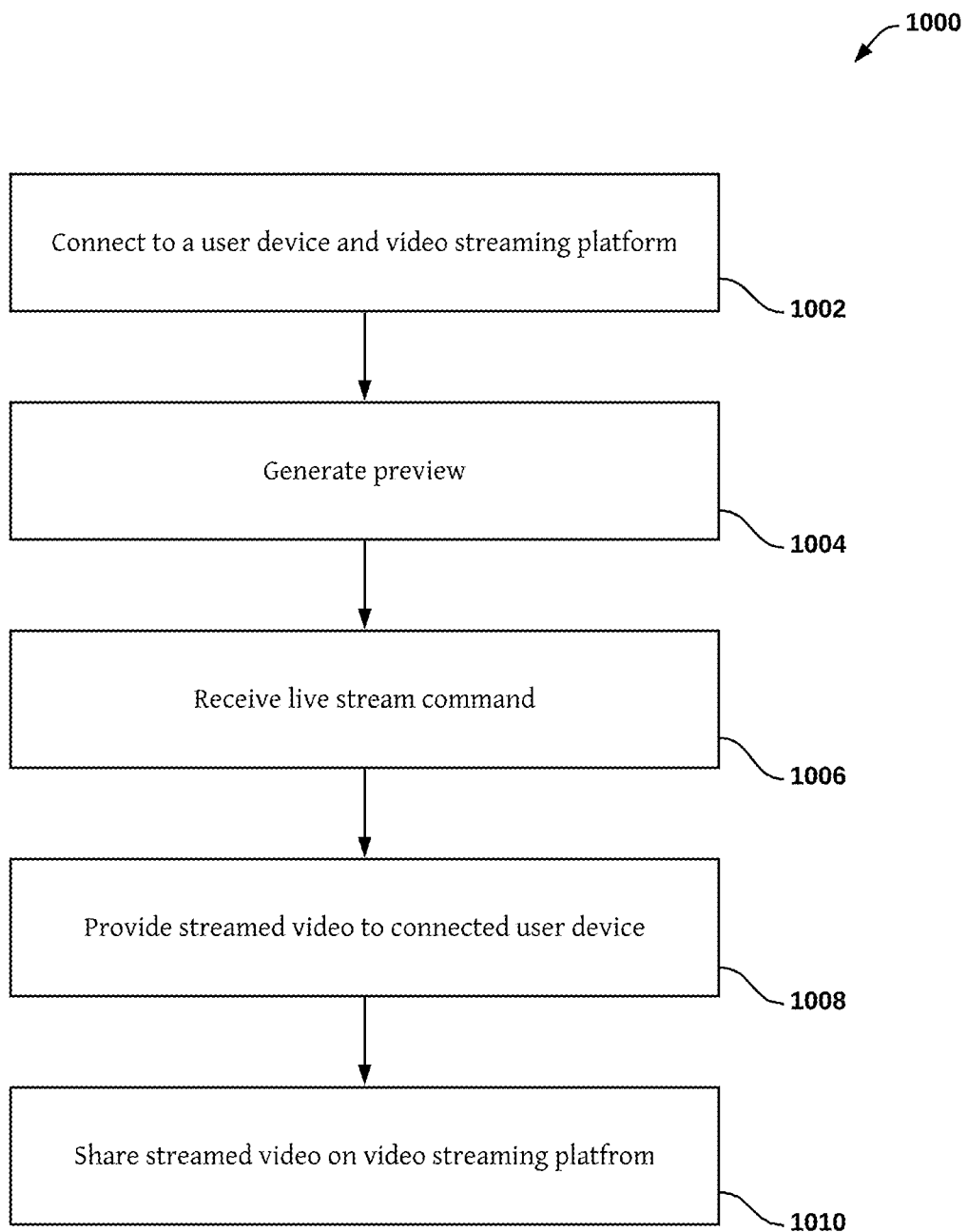
FIG. 10 is a flow diagram showing an exemplary process for streaming selfie content using the system shown in FIG. 2.

FIG. 10 illustrates an exemplary process 1000 for live streaming selfie content. At step 1002, a selfie camera connects to a user device to establish a communication pathway for transferring messages and data. Once a connection is established, a selfie video preview may be provided to a user device, in step 1004. The video image preview may be a live video stream of a scene as viewed by the selfie camera device. One or more aspects to the selfie video preview may be modified to simulate the appearance of selfie content on a social media and/or video streaming platform. At step 906, a selfie camera receives a live stream command from a connected user device and connects to a social media and/or streaming video platform. The selfie camera may provide streamed video content to a connected user device in step 1008 and simultaneously share streamed video on a video streaming platform at step 1010.

Figure 11:
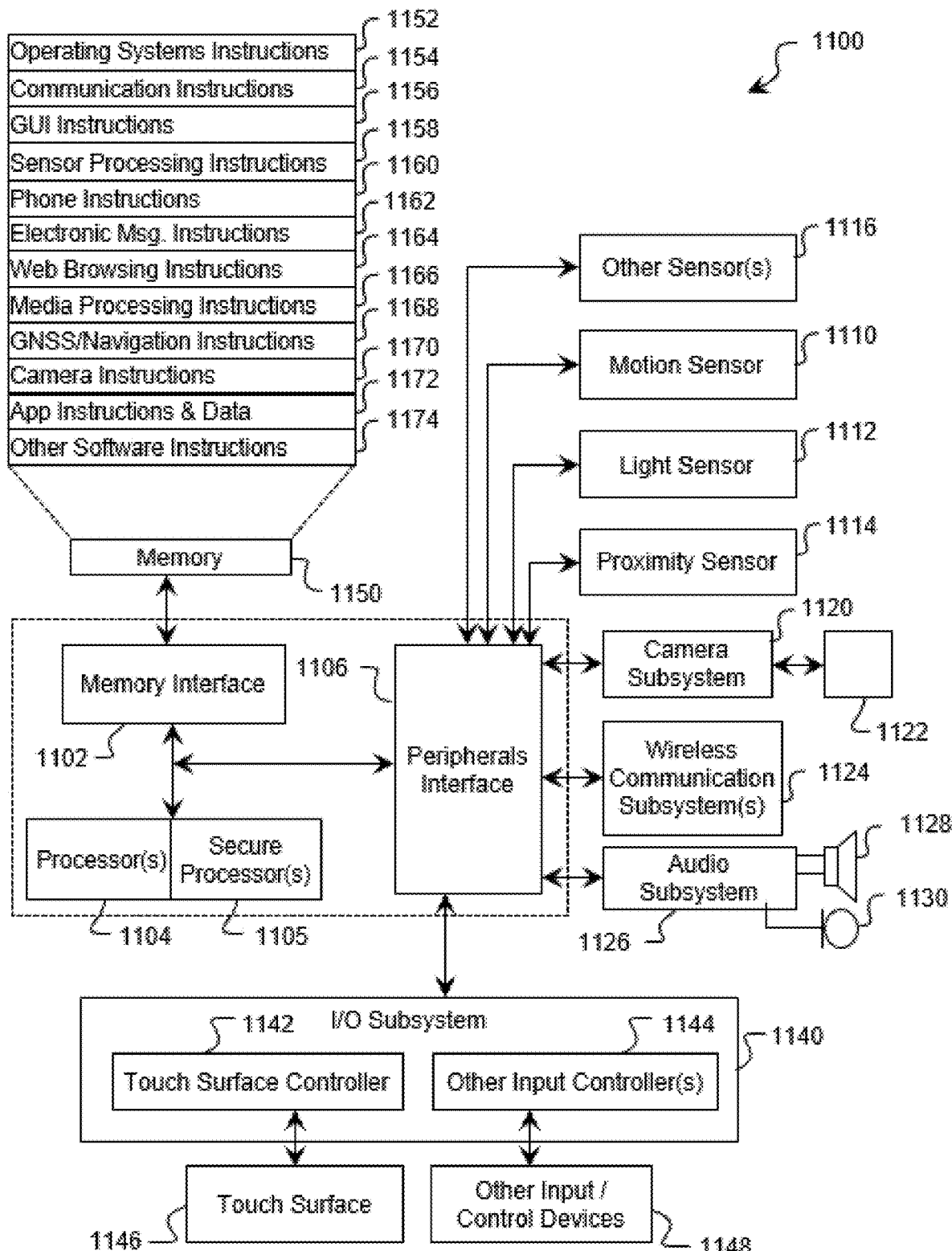
FIG. 11 is a block diagram of an illustrative user device that may be used to implement the system of FIG. 3.

FIG. 11 shows a user device 1100, according to an embodiment of the present disclosure. The illustrative user device 1100 may include a memory interface 1102, one or more data processors, image processors, central processing units 1104, and/or secure processing units 1105, and a peripherals interface 1106. The memory interface 1102, the one or more processors 1104 and/or secure processors 1105, and/or the peripherals interface 1106 may be separate components or may be integrated into one or more integrated circuits. The various components in the user device 1100 may be coupled by one or more communication buses or signal lines.

Sensors, devices, and subsystems may be coupled to the peripherals interface 1106 to facilitate multiple functionalities. For example, a motion sensor 1110, a light sensor 1112, and a proximity sensor 1114 may be coupled to the peripherals interface 1106 to facilitate orientation, lighting, and proximity functions. Other sensors 1116 may also be connected to the peripherals interface 1106, such as a global navigation satellite system (GNSS) (e.g., GPS receiver), a temperature sensor, a biometric sensor, depth sensor, magnetometer, or another sensing device, to facilitate related functionalities.

A camera subsystem 1120 and an optical sensor 1122, e.g., a charged coupled device (CCD) or a complementary metal-oxide semiconductor (CMOS) optical sensor, may be utilized to facilitate camera functions, such as recording photographs and video clips. The camera subsystem 1120 and the optical sensor 1122 may be used to collect images of a user to be used during authentication of a user, e.g., by performing facial recognition analysis.

Communication functions may be facilitated through one or more wired and/or wireless communication subsystems 1124, which can include radio frequency receivers and transmitters and/or optical (e.g., infrared) receivers and transmitters. For example, the Bluetooth (e.g., Bluetooth low energy (BILE)) and/or WiFi communications described herein may be handled by wireless communication subsystems 1124. The specific design and implementation of the communication subsystems 1124 may depend on the communication network(s) over which the user device 1100 is intended to operate. For example, the user device 1100 may include communication subsystems 1124 designed to operate over a GSM network, a GPRS network, an EDGE network, a WiFi or WiMax network, and a Bluetooth™ network. For example, the wireless communication subsystems 1124 may include hosting protocols such that the device 1100 can be configured as a base station for other wireless devices and/or to provide a WiFi service.

An audio subsystem 1126 may be coupled to a speaker 1128 and a microphone 1130 to facilitate voice-enabled functions, such as speaker recognition, voice replication, digital recording, and telephony functions. The audio subsystem 1126 may be configured to facilitate processing voice commands, voiceprinting, and voice authentication, for example.

The I/O subsystem 1140 may include a touch-surface controller 1142 and/or another input controller(s) 1144. The touch-surface controller 1142 may be coupled to a touch surface 1146. The touch surface 1146 and touch-surface controller 1142 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1146.

The other input controller(s) 1144 may be coupled to other input/control devices 1148, such as one or more buttons, rocker switches, thumb-wheel, infrared port, USB port, and/or a pointer device such as a stylus. The one or more buttons (not shown) may include an up/down button for volume control of the speaker 1128 and/or the microphone 1130.

In some implementations, a pressing of the button for a first duration may disengage a lock of the touch surface 1146; and a pressing of the button for a second duration that is longer than the first duration may turn power to the user device 1100 on or off. Pressing the button for a third duration may activate a voice control, or voice command, a module that enables the user to speak commands into the microphone 1130 to cause the device to execute the spoken command. The user may customize a functionality of one or more of the buttons. The touch surface 1146 can, for example, also be used to implement virtual or soft buttons and/or a keyboard.

In some implementations, the user device 1100 may present recorded audio and/or video files, such as MP3, AAC, and MPEG files. In some implementations, the user device 1100 may include the functionality of an MP3 player, such as an iPod™. The user device 1100 may, therefore, include a 36-pin connector and/or 8-pin connector that is compatible with the iPod. Other input/output and control devices may also be used.

The memory interface 1102 may be coupled to memory 1150. The memory 1150 may include high-speed random access memory and/or non-volatile memory, such as one or more magnetic disk storage devices, one or more optical storage devices, and/or flash memory (e.g., NAND, NOR). The memory 1150 may store an operating system 1152, such as Darwin, RTXC, LINUX, UNIX, OS X, WINDOWS, or an embedded operating system such as VxWorks.

The operating system 1152 may include instructions for handling basic system services and for performing hardware dependent tasks. In some implementations, the operating system 1152 may be a kernel (e.g., UNIX kernel). In some implementations, the operating system 1152 may include instructions for performing voice authentication.

The memory 1150 may also store communication instructions 1154 to facilitate communicating with one or more additional devices, one or more computers and/or one or more servers. The memory 1150 may include graphical user interface (GUI) instructions 1156 to facilitate graphic user interface processing; sensor processing instructions 1158 to facilitate sensor-related processing and functions; phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GNSS/Navigation instructions 1168 to facilitate GNSS and navigation-related processes and instructions; and/or camera instructions 1170 to facilitate camera-related processes and functions.

The memory 1150 may store application instructions and data 1172 for recognizing GUIs displaying content on a specific social media and/or video streaming platform; capturing characteristics of content displayed in relevant GUIs; generating selfie content previews using captured characteristics; sending settle content to a server device; communicating with a selfie camera; and editing captured selfie content. In various implementations, application data may include social media and/or video streaming platform content characteristics, selfie camera control commands, instructions for sharing selfie content, and other information used or generated by other applications persisted on a user device.

The memory 1150 may also store other software instructions 1174, such as web video instructions to facilitate web video-related processes and functions; and/or web instructions to facilitate content sharing-related processes and functions. In some implementations, the media processing instructions 1166 may be divided into audio processing instructions and video processing instructions to facilitate audio processing-related processes and functions and video processing-related processes and functions, respectively.

Each of the above-identified instructions and applications may correspond to a set of instructions for performing one or more functions described herein. These instructions need not be implemented as separate software programs, procedures, or modules. The memory 1150 may include additional instructions or fewer instructions. Furthermore, various functions of the user device 1100 may be implemented in hardware and/or in software, including in one or more signal processing and/or application specific integrated circuits.

In some embodiments, processor 1104 may perform processing including executing instructions stored in memory 1150, and secure processor 1105 may perform some processing in a secure environment that may be inaccessible to other components of user device 1100. For example, secure processor 1105 may include cryptographic algorithms on board, hardware encryption, and physical tamper proofing. Secure processor 1105 may be manufactured in secure facilities. Secure processor 1105 may encrypt data/challenges from external devices. Secure processor 1105 may encrypt entire data packages that may be sent from user device 1100 to the network. Secure processor 1105 may separate a valid user/external device from a spoofed one, since a hacked or spoofed device may not have the private keys necessary to encrypt-'decrypt, hash, or digitally sign data, as described herein.

Figure 12:
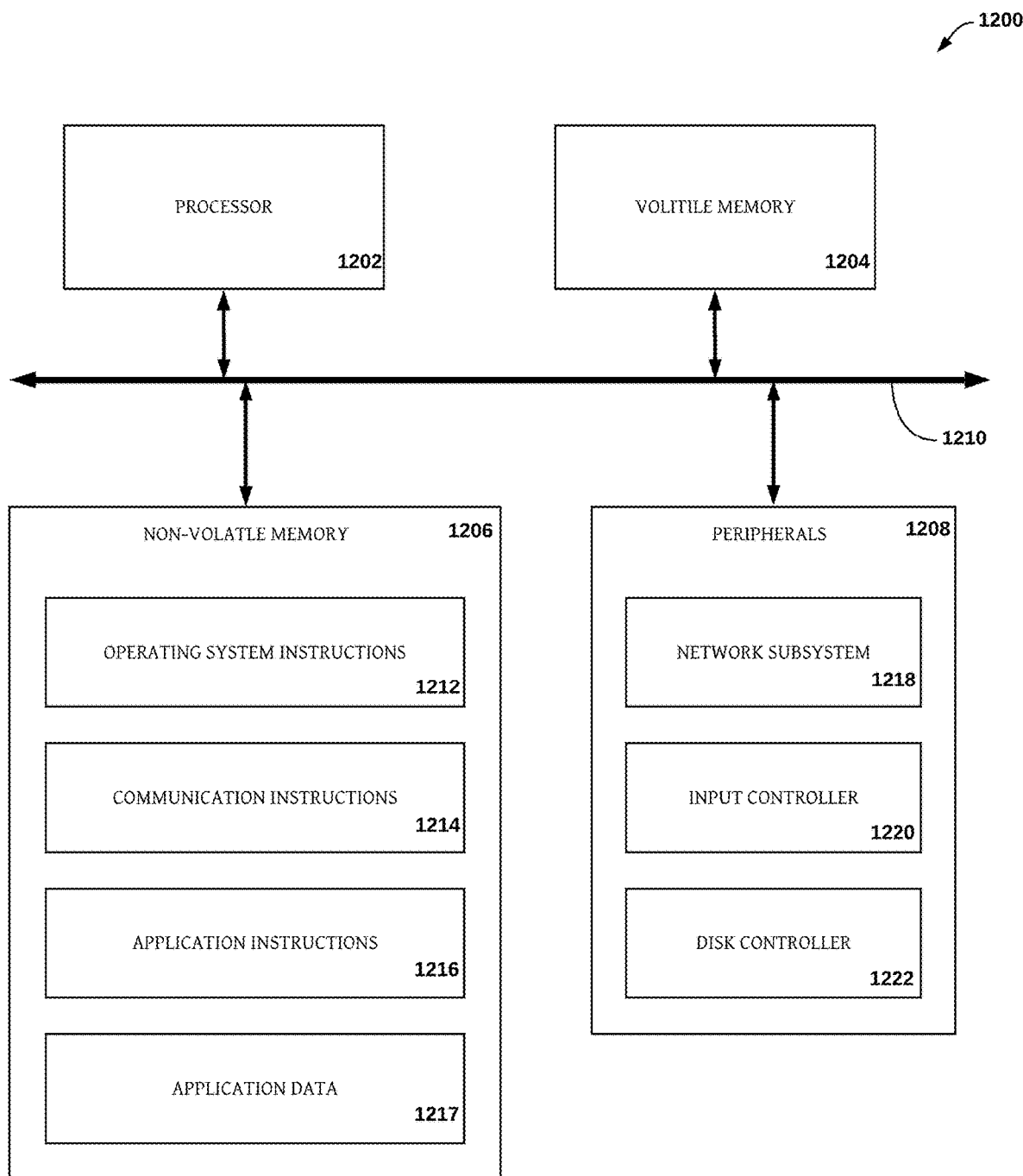
FIG. 12 is a block diagram of an illustrative server device that may be used to implement the system of FIG. 3.

FIG. 12 shows an illustrative computer 1200 that may implement the archiving system and various features and processes as described herein. The computer 1200 may be any electronic device that runs software applications derived from compiled instructions, including without limitation personal computers, servers, smart phones, media players, electronic tablets, game consoles, email devices, etc. In some implementations, the computer 1200 may include one or more processors 1202, volatile memory 1204, non-volatile memory 1206, and one or more peripherals 1208. These components may be interconnected by one or more computer buses 1210.

Processor(s) 1202 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 1210 may be any known internal or external bus technology, including but not limited to ISA, EISA, PCI, PCI Express, NuBus, USB, Serial ATA or fireWire. Volatile memory 1204 may include, for example, SDRAM. Processor 1202 may receive instructions and data from a read-only memory or a random access memory or both. The essential elements of a computer may include a processor for executing instructions and one or more memories for storing instructions and data.

Non-volatile memory 1206 may include, by way of example, semiconductor memory devices, such as EPROM, EEPROM, and flash memory devices; magnetic disks such as internal hard disks and removable disks; magneto-optical disks; and CD-ROM and DVD-ROM disks. Non-volatile memory 1206 may store various computer instructions including operating system instructions 1212, communication instructions 1214, application instructions 1216, and application data 1217. Operating system instructions 1212 may include instructions for implementing an operating system (e.g., Mac OS®, Windows®, or Linux).

The operating system may be multi-user, multiprocessing, multitasking, multithreading, real-time, and the like. Communication instructions 1214 may include network communications instructions, for example, software for implementing communication protocols, such as TCP/IP, HTTP, Ethernet, telephony, etc. Application instructions 1216 can include social media and/or video streaming platform content characteristics, selfie camera control commands, instructions for sharing selfie content, and other information used or generated by other applications persisted on a user device. For example, application instructions 1216 may include instructions for modifying settle content previews, editing captured selfie content, and/or capturing and sharing selfie content using the system shown in FIG. 1. Application data 1217 may correspond to data stored by the applications running on the computer 1200. For example, application data 1217 may include selfie content, commands for controlling a selfie camera, image data received from a selfie camera, content characteristics retrieved from a social media and/or content video streaming platform, and/or instructions for sharing selfie content.

Peripherals 1208 may be included within the computer 1200 or operatively coupled to communicate with the computer 1200. Peripherals 1208 may include, for example, network interfaces 1218, input devices 1220, and storage devices 1222. Network interfaces 1218 may include, for example, an Ethernet or WiFi adapter for communicating over one or more wired or wireless networks. Input devices 1220 may be any known input device technology, including but not limited to a keyboard (including a virtual keyboard), mouse, trackball, and touch-sensitive pad or display. Storage devices 1222 may include one or more mass storage devices for storing data files; such devices include magnetic disks such as internal hard disks and removable disks; magneto-optical disks; and optical disks.

Figure 13:
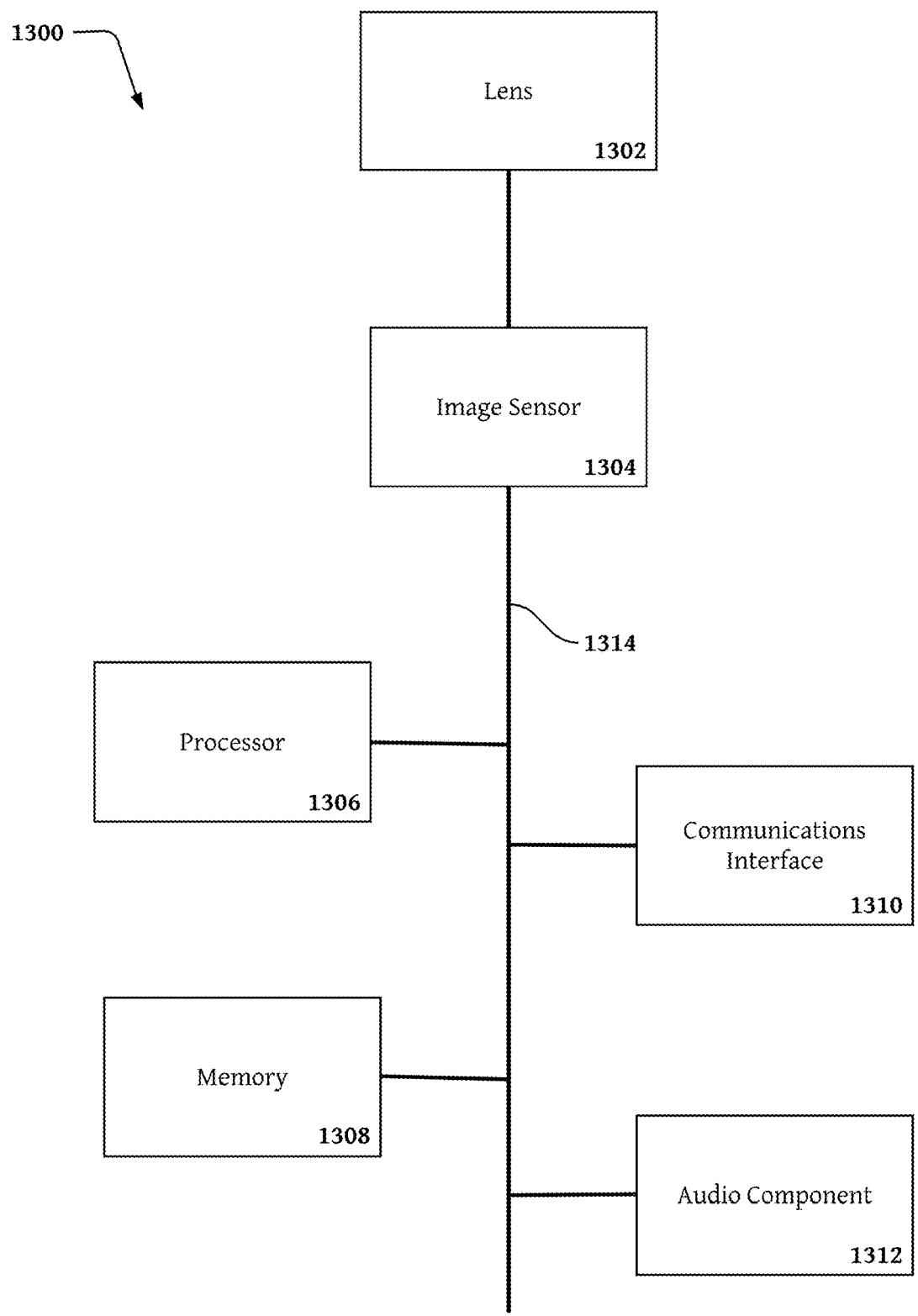
FIG. 13 is a block diagram of the camera device shown in FIG. 4.

As shown in FIG. 13, the camera device 1300 includes one or more image sensors 1304 fitted with one lens 1302 per sensor. The lens 1302 and image sensor 1304 can capture images or video content. Each image sensors 1304 and lens 1302 may have associated parameters, such as the sensor size, resolution, and interocular distance, the lens focal lengths, lens distortion centers, lens skew coefficient, and lens distortion coefficients. The parameters of each image sensor and lens may be unique for each image sensor or lens, and are often determined through a stereoscopic camera calibration process. The camera device 1300 can further include a processor 1306 for executing commands and instructions to provide communications, capture, data transfer, and other functions of the camera device as well as memory 1308 for storing digital data and streaming video. For example, the storage device can be, e.g., a flash memory, a solid-state drive (SSD) or a magnetic storage device. The camera device may include a communications interface 1310 for communicating with external devices. For example, the stereoscopic device can include a wireless communications module for connecting to an external device (e.g., a laptop, an external hard drive, a tablet, a smart phone) for transmitting the data and/or messages to the external device. The camera device 1300 may also include an audio component 1312 (e.g., a microphone or other known audio sensor) for capturing audio content. A bus 1314, for example, a high-bandwidth bus, such as an Advanced High-performance Bus (AHB) matrix interconnects the electrical components of the camera device 1300.

Figure 14:
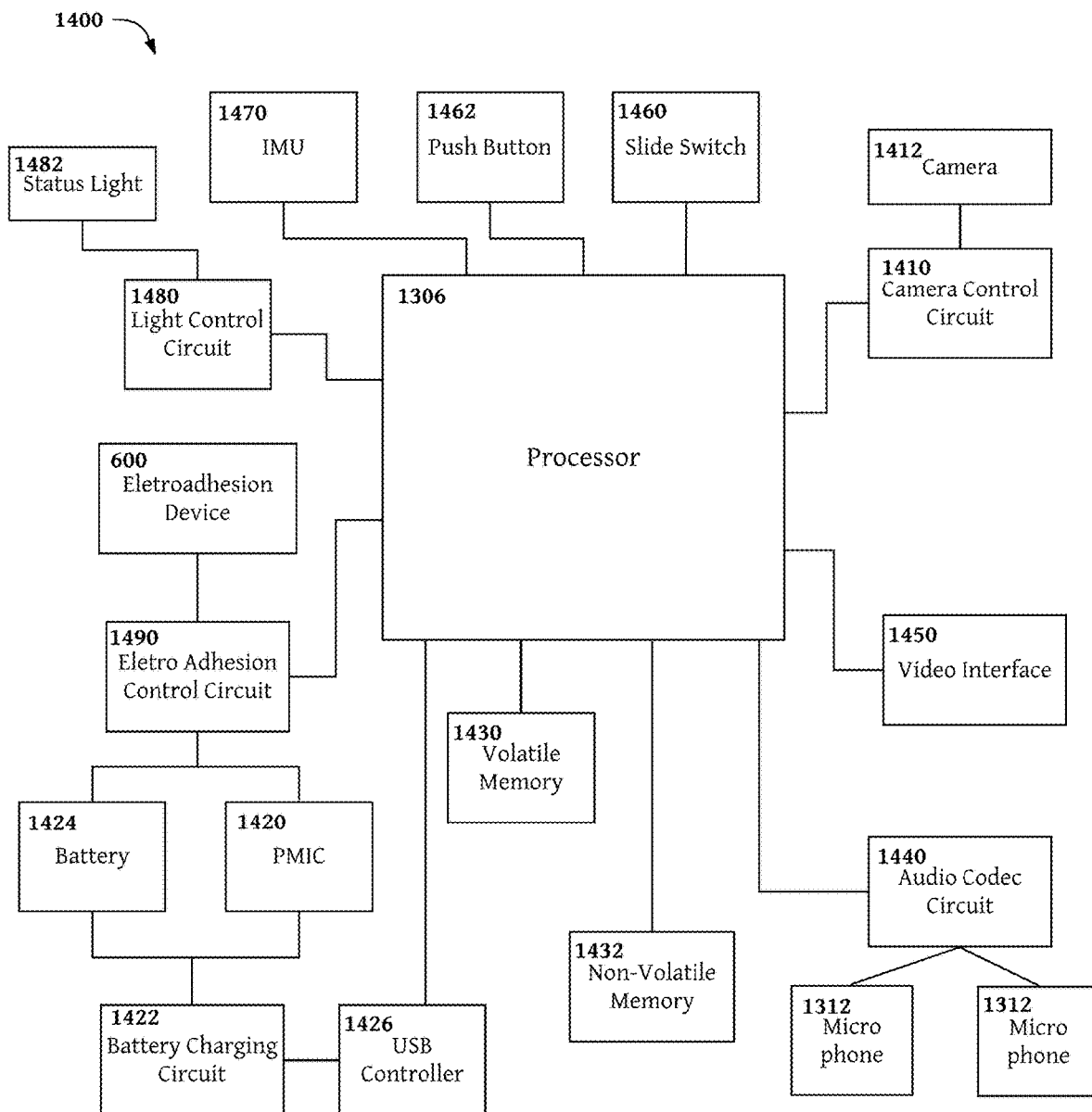
FIG. 14 is a block diagram illustrating more details of portions of the camera device shown in FIG. 13.

FIG. 14 show more details of the processor 1306 of the camera device shown in FIG. 13. A video processor controls a camera 1412 (e.g., a selfie camera) using a camera control circuit 1410 according to commands received from a selfie camera controller. A power management integrated circuit (PMIC) 1420 is responsible for controlling a battery charging circuit 1422 to charge a battery 1424. The battery 1424 supplies electrical energy for running the camera device 1300. The PMIC 1420 may also control a electro adhesion control circuit 1490 that supplies power to an electroadhesion device 600. The processor 1306 can be connected to an external device via a USB controller 1426. In some embodiments, the battery charging circuit 1422 receives external electrical energy via the USB controller 1426 for charging the battery 1424.

The camera device 1300 may include a volatile memory 1430 (e.g., double data rate memory or 4R memory) and a non-volatile memory 1432 (e.g., embedded MMC or eMMC, solid-state drive or SSD, etc.). The processor 1306 can also control an audio codec circuit 1440, which collects audio signals from microphone 1312 and microphone 1312 for stereo sound recording. The camera device 1300 can include additional components to communicate with external devices. For example, the processor 1306 can be connected to a video interface 1350 (e.g., Wifi connection, UDP interface, TCP link, high-definition multimedia interface or HDMI, and the like) for sending video signals to an external device. The camera device 1300 can further include an interface conforming to Joint Test Action Group (JTAG) standard and Universal Asynchronous Receiver/Transmitter (UART) standard. The camera device 1300 can include a slide switch 1460 and a push button 1462 for operating the camera device 1300. For example, a user may turn on or off the camera device 1300 by pressing the push button 1462. The user may switch on or off the electroadhesion device 600 using the slide switch 1460. The camera device 1300 can include an inertial measurement unit (IMU) 1470 for detecting orientation and/or motion of the camera device 1300. The processor 1310 can further control a light control circuit 1480 for controlling the status lights 1482. The status lights 1482 can include, e.g., multiple light-emitting diodes (LEDs) in different colors for showing various status of the camera device 1300.

The foregoing description is intended to convey a thorough understanding of the embodiments described by providing a number of specific exemplary embodiments and details involving previewing, capturing, editing, and sharing pieces of content to improve the efficiency of capturing selfie content and the quality of captured selfie content. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. A user device and server device are used as examples for the disclosure. The disclosure is not intended to be limited GUI display screens, image capture systems, data extraction processors, and client devices only. For example, many other electronic devices may utilize a system to preview, capture, and share piece of content including selfie images and videos.

Methods described herein may represent processing that occurs within a system (e.g., system 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including, by ways of example, semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

As used herein, the terms "and/or" and "at least one of" include any and all combinations of one or more of the associated listed items.

Certain details are set forth in the foregoing description and in FIGS. 1-14 to provide a thorough understanding of various embodiments of the present invention. Other details describing well-known structures and systems often associated with image processing, camera systems, user devices, and server devices, etc., however, are not set forth below to avoid unnecessarily obscuring the description of the various embodiments of the present invention.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. An electroadhesion device, comprising:
   a case including a removable attachment, the removable attachment including,
   a compliant thin film including a plurality of electrodes and insulating material formed between the plurality of electrodes,
   wherein the insulating material including a plurality of layers, and
   wherein the plurality of electrodes are arranged in pairs where each pair includes one each of negative and positive polarity, and
   wherein the electrodes include voltage converters configured to convert low voltage power to high voltage charges;
   a battery included in the case wherein the battery is configured to power the plurality of electrodes;
   a power management integrated circuit included in the case, in communication with the plurality of electrodes, the power management integrated circuit configured to activate and deactivate the plurality of electrodes with a response time less than about 50 milliseconds;
   wherein at least one sensor included the case, the sensor configured to determine conductivity of a surface placed in close proximity to the sensor; and
   wherein the case includes a selfie camera device.

2. The electroadhesion device of claim 1 further comprising, a digital switch in communication with the voltage converters and the at least one sensor, the digital switch configured to control the voltage converters voltage output based on conductivity data received from the at least one sensor.

3. The electroadhesion device of claim 2 wherein the digital switch further configured to use a look up table to determine adjustable voltage based on the sensor data.

4. The electroadhesion device of claim 2 wherein the digital switch further configured to use a predetermined algorithm to determine adjustable voltage based on the sensor data.

5. The electroadhesion device of claim 2 wherein the sensor includes at least one of: a Hall effect sensor, a magnetic field sensor, a time domain reflectometry (TDR) porosity sensor, a wave form sensor, a motion sensor; a surface texture sensor; a surface profile sensor, or a surface morphology sensor.

6. The electroadhesion device of claim 5 wherein the a wave form sensor is at least one of an ultrasound sensor, a radar sensor, an infrared sensor, a dot field projection depth sensor, or a time of flight depth sensor.

7. The electroadhesion device of claim 1 wherein the sensor is in communication with a status light configured to indicate a safe voltage.

8. The electroadhesion device of claim 1 wherein voltage generated by the voltage converter is a range of DC voltage from 250 V to 10,000 V.

9. The electroadhesion device of claim 1 wherein voltage generated by the voltage converter is a range of DC voltage from 500 V to 2,000 V.

10. The electroadhesion device of claim 1 wherein voltage generated by the voltage converter is a range of DC voltage from 6,000 V to 8,000 V.

11. The electroadhesion device of claim 1 wherein voltage generated by the voltage converter is a range of AC voltage from 250 Vrms to 10,000 Vrms.

12. The electroadhesion device of claim 1 wherein voltage generated by the voltage converter is a range of DC voltage from 500 Vrms to 2,000 Vrms.

13. The electroadhesion device of claim 1 wherein voltage generated by the voltage converter is a range of DC voltage from 6,000 Vrms to 8,000 Vrms.

14. An electroadhesion device, comprising:
- a case including a removable attachment, the removable attachment including,
- a compliant thin film including a plurality of electrodes and insulating material formed between the plurality of electrodes,
- wherein the insulating material including a plurality of layers, and
- wherein the plurality of electrodes are arranged in pairs where each pair includes one each of negative and positive polarity, and
- wherein the electrodes include voltage converters configured to convert low voltage power to high voltage charges;
- a battery included in the case wherein the battery is configured to power the plurality of electrodes;
- a power management integrated circuit included in the case, in communication with the plurality of electrodes, the power management integrated circuit configured to activate and deactivate the plurality of electrodes with a response time less than about 50 milliseconds;
- wherein at least one sensor included the case, the sensor configured to determine conductivity of a surface placed in close proximity to the sensor;
- wherein the sensor is one of an electromagnetic conductivity sensor, Hall effect sensor, magnetic field sensor, porosity sensor, wave form sensor, or motion sensor.

15. The electroadhesion device of claim 14 further comprising,
- a digital switch in communication with the voltage converters and the at least one sensor, the digital switch configured to control the voltage converters voltage output based on conductivity data received from the at least one sensor.

16. The electroadhesion device of claim 15 wherein the digital switch further configured to use a look up table to determine adjustable voltage based on the sensor data.

17. The electroadhesion device of claim 15 wherein the digital switch further configured to use a predetermined algorithm to determine adjustable voltage based on the sensor data.

18. The electroadhesion device of claim 14 wherein the case includes a selfie camera device.

19. The electroadhesion device of claim 14 wherein the sensor is in communication with a status light configured to indicate a safe voltage.

20. The electroadhesion device of claim 14 wherein voltage generated by the voltage converter is a range of DC voltage from 250 V to 10,000 V.

* * * * *